(12) United States Patent
Dajaku

(10) Patent No.: US 8,536,754 B2
(45) Date of Patent: Sep. 17, 2013

(54) ELECTRIC MOTOR

(75) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 186 days.

(21) Appl. No.: 13/123,710

(22) PCT Filed: Oct. 7, 2009

(86) PCT No.: PCT/EP2009/063055
§ 371 (c)(1),
(2), (4) Date: Sep. 12, 2011

(87) PCT Pub. No.: WO2010/040785
PCT Pub. Date: Apr. 15, 2010

(65) Prior Publication Data
US 2012/0001512 A1 Jan. 5, 2012

(30) Foreign Application Priority Data

Oct. 9, 2008 (DE) .......................... 10 2008 051 047

(51) Int. Cl.
*H02K 1/00* (2006.01)
(52) U.S. Cl.
USPC ............................. 310/195; 310/180; 310/184
(58) Field of Classification Search
USPC .......................... 310/179–180, 184, 195, 202
See application file for complete search history.

(56) References Cited

U.S. PATENT DOCUMENTS

| | | | | |
|---|---|---|---|---|
| 4,918,347 A * | 4/1990 | Takaba | ........................... | 310/179 |
| 5,723,930 A * | 3/1998 | Ho et al. | ........................ | 310/179 |
| 6,008,561 A * | 12/1999 | Tang | ............................ | 310/183 |
| 6,127,760 A | 10/2000 | Nagasaki et al. | | |
| 6,166,471 A * | 12/2000 | Kometani et al. | ............. | 310/198 |
| 6,504,283 B1 | 1/2003 | Asao et al. | | |
| 6,759,780 B2 * | 7/2004 | Liu et al. | ........................ | 310/184 |
| 7,605,514 B2 * | 10/2009 | Ito et al. | ........................ | 310/180 |
| 2002/0167242 A1 * | 11/2002 | Liu et al. | ........................ | 310/184 |
| 2006/0208595 A1 | 9/2006 | Bradfield | | |
| 2007/0194650 A1 | 8/2007 | Ito et al. | | |
| 2009/0218904 A1 | 9/2009 | Vollmer | | |
| 2010/0187941 A1 | 7/2010 | Roth et al. | | |

FOREIGN PATENT DOCUMENTS

| | | |
|---|---|---|
| CN | 101019296 | 8/2007 |
| CN | 101026317 | 8/2007 |
| DE | 198 18 432 | 11/1998 |
| DE | 10 2004 036 727 | 3/2006 |
| DE | 10 2005 039 176 | 2/2007 |

(Continued)

OTHER PUBLICATIONS

Gerling, D. et al. "Three-Dimensional Analytical Calculation of Induction Machines with Multilayer Rotor Structure in Cylindrical Coordinates", Electrical Engineering, pp. 199-211, Nov. 2003.

(Continued)

*Primary Examiner* — Thanh Lam
(74) *Attorney, Agent, or Firm* — Cozen O'Connor

(57) ABSTRACT

An electrical machine comprising a stator (1) and a rotor (2) movable relative to the stator is provided. The stator (1) comprises a doubled number of notches (3) with respect to a pole pair number p of the rotor. This is combined with differing numbers (n1, n2) of turns per phase winding or with differing tooth widths (Z1, Z2) of teeth (6, 7) of the stator which are formed between neighboring notches (3).

23 Claims, 30 Drawing Sheets

(56) References Cited

FOREIGN PATENT DOCUMENTS

| DE | 10 2007 004 561 | 7/2008 |
|---|---|---|
| EP | 1 257 040 | 11/2002 |
| FR | 1 335 551 | 8/1963 |
| FR | 2 404 946 | 4/1979 |
| FR | 2 418 564 | 9/1979 |
| FR | 2 869 478 | 10/2005 |
| GB | 2 015 829 | 9/1979 |
| JP | 62-166759 | 7/1987 |
| JP | 62-230346 | 10/1987 |

OTHER PUBLICATIONS

Gerling, D., "Analysis of the Magnetomotive Force of a Three-Phase Winding with Concentrated Coils and Different Symmetry Features", University of Federal Defense, 6 pages, 2008.

Gerling, D. "Design of an Induction Motor with Multilayer Rotor Structure and Large Gap", Proceedings of the International Conference on Electrical Machines (ICEM), vol. 1, 4 pages, 2000.

Cros, J. et al. "Synthesis of High Performance PM Motors With Concentrated Windings", IEEE Transactions on Energy Conversation, vol. 17, pp. 725-727, 2002.

Güemes, J., et al. "Analysis of Torque in Permanent Magnet Synchronous Motors with Fractional Slot Windings", Proceedings of the 2008 International Conference on Electrical Machines, 4 pages, 2008.

Ishak, D. et al. "Comparison of PM Brushless Motors, Having Either All Teeth or Alternate Teeth Wound", IEEE Transactions on Energy Conversation, vol. 21, No. 1, pp. 95-103, Mar. 2006.

Magnussen, C. et al. "Winding Factors and Joule Losses of Permanent Magnet Machines with Concentrated Windings", 2003 IEEE International Electric Machines & Drives Conference, 7 pages, 2003.

Polinder, H. et al. "Eddy-Current Losses in the Solid Back-Iron of PM Machines for Different Concentrated Fractional Pitch Windings", International Electric Machines & Drives Conference, pp. 652-657, 2007.

\* cited by examiner

Fig. 2A
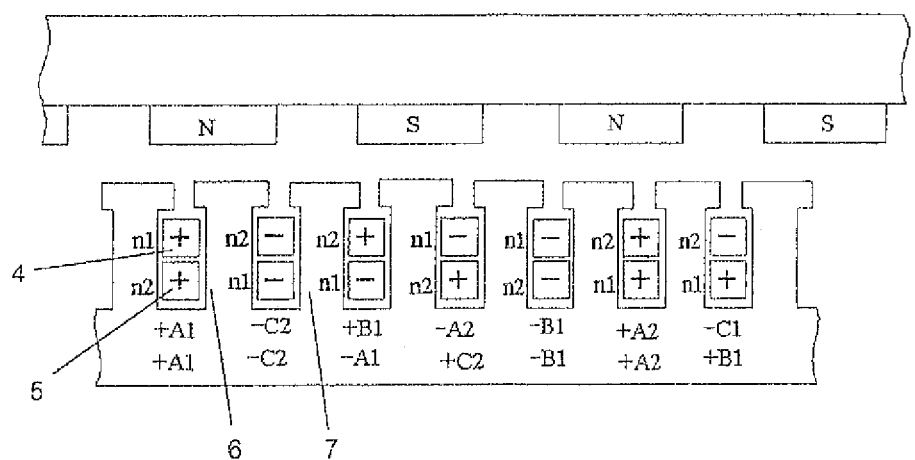
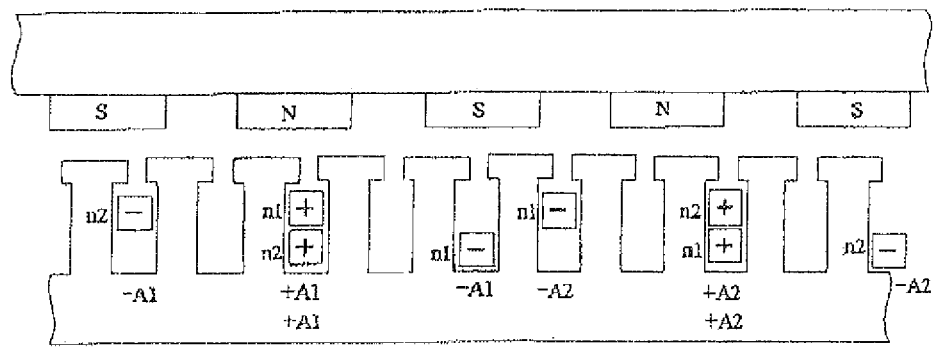

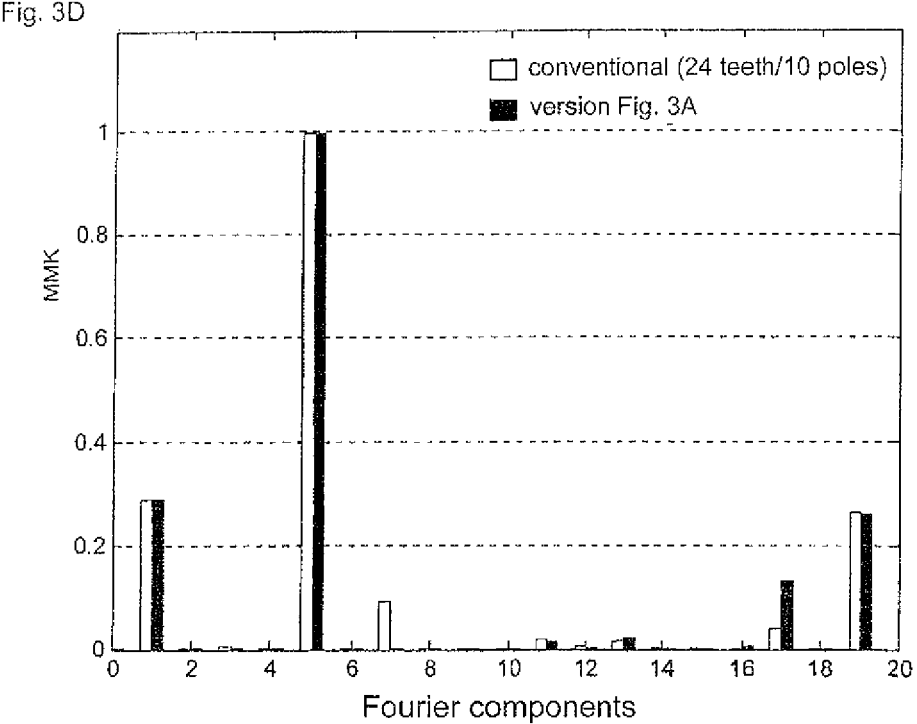

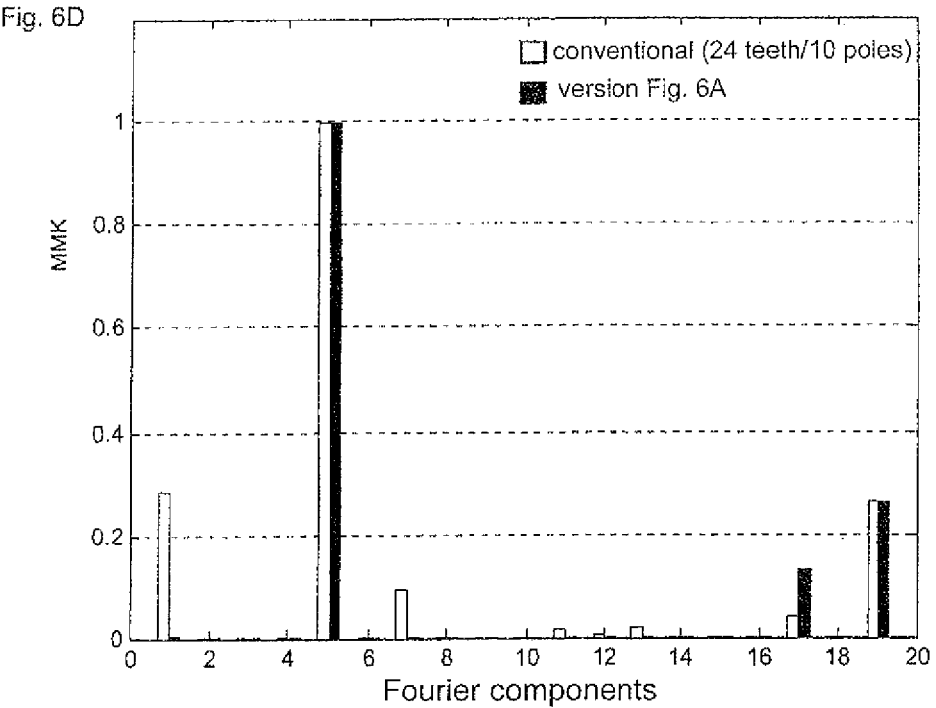

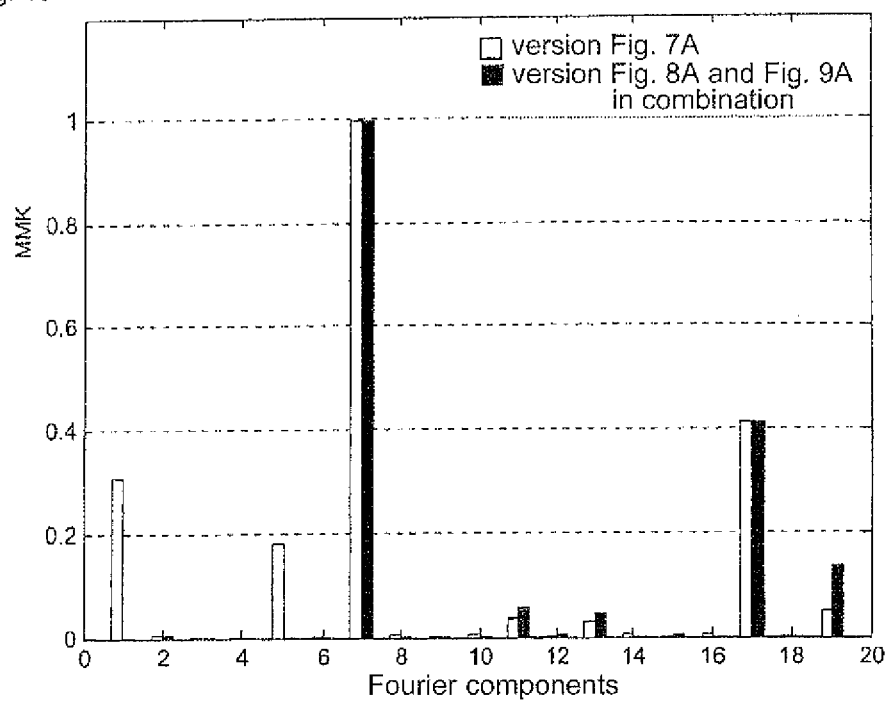

ELECTRIC MOTOR

RELATED APPLICATIONS

This is a U.S. national stage of application No. PCT/EP2009/063055, filed on Oct. 7, 2009.

This application claims the priority of German application no. 10 2008 051 047.5 filed Oct. 9, 2008, the entire content of which is hereby incorporated by reference.

FIELD OF THE INVENTION

The present invention relates to an electrical machine.

BACKGROUND OF THE INVENTION

Electrical machines usually comprise a housing-fixed stator as well as a rotor which can be moved relative thereto. The rotor may be supported so as to be rotatable with respect to the stator or so as to be linearly movable relative thereto, for instance. Electrical machines are ascribed to the electro-mechanical energy converters. In that context, they may operate as a motor or generator.

Electrical machines may be used for propelling motor vehicles, for instance. It is desirable here to achieve defined characteristics of the operational behavior of the electrical machine. The torque, the acoustic properties, the iron losses, the losses in permanent magnets in case such magnets are used, and the losses in windings are among these characteristics.

Electrical machines with concentrated windings are distinguished by compact designs compared to those with distributed windings. Winding types such as the fractional slot winding allow different combinations of the pole pair number and the number of the notches. The number of the pole pairs in the rotor is understood as the pole pair number, whereas the notches in the stator serve to receive the windings.

With electrical machines in motor vehicle drive systems, those with three electrical phases are most common among the multi-phase machines. Here, a three-phase machine can be connected to an electrical three-phase system with three phases which are shifted in their phase by 120° relative to each other.

Each magnetic pole pair in the rotor comprises two magnetic poles, a north pole and a south pole.

The number of the notches per pole and per phase is defined as $$q = Q_s/(2 \cdot p \cdot m),$$

where m designates the number of the phases, $Q_s$ the number of the notches and p the number of the pole pairs.

Document US 2007/0194650 A1 describes an electrical machine comprising twelve notches and ten poles. In a machine of this type, the magnetomotive force (MMF) induced in operation by the stator is not distributed according to a simple sine wave. When analyzing the magnetomotive force and its harmonic components, for instance with a Fourier decomposition, it is rather obvious that numerous undesired harmonic components occur. Here, all harmonic components other than that used as the operating wave of the electrical machine are undesired as these may result in losses and, in addition, may cause undesired acoustic impairments.

It is therefore desirable to reduce the undesired harmonic components of the magnetomotive force or to eliminate them.

The operating wave may also be referred to as synchronized component. The torque of an electrical machine can be calculated from the electrical load distribution, or from the distribution of the magnetomotive force and the flux density distribution. A torque is generated whenever the harmonic order of the wave of the magnetomotive force and the harmonic order of a wave of the flux density coincide.

In order to produce a time-independent torque, the number of the pole pairs of the rotor in the considered minimum symmetry must coincide with the harmonic order of the main wave of the magnetomotive force, related to said symmetry. The required symmetry may be given, for instance, on the quarter perimeter or the half perimeter of a rotating electrical machine.

It is not necessarily the main wave which may be applied as the operating wave; using a higher-order harmonic component of the magnetomotive force is also possible.

SUMMARY OF THE INVENTION

It is one object of the present invention to provide an electrical machine in which undesired components of the Fourier decomposition of the magnetomotive force are reduced.

In one embodiment, the electrical machine comprises a stator and a rotor which can be moved relative to the stator and has a pole pair number. The stator comprises at least one first and at least one second electrical winding of a common electrical phase. The stator comprises a doubled number of notches with respect to the required minimum number of notches for the given pole pair number of the rotor. In a notch of the stator, the number of turns of the first electrical winding differs from a number of turns of the second electrical winding in this notch.

To give an example, at least 12 notches are required in a machine with 10 poles so that, with this given pole number, a doubling of the number of the notches results in a number of 24 notches.

In a machine with 14 poles, at least 12 notches are required as well so that a doubling of the number of notches according to the suggested principle results in this example in an electrical machine with 14 poles and likewise 24 notches.

In terms of the required minimum number of notches, a concentrated winding is preferably assumed which is wound around the teeth of the stator. In this arrangement, it is not necessary that each tooth carries a winding. It is possible to realize one-layer or multi-layered windings.

The table below generally shows examples of the possible machine topologies. Here, n represents the number of the coils of a strand around neighboring teeth, $2p$ indicates the number of the poles in the rotor and Z is the number of the teeth or notches. The minimum number of teeth and poles is indicated for concentrated windings. Integer multiples of the number of the notches and the number of the poles are possible.

|  |  | 2 strands | | 3 strands | | 4 strands | | 5 strands | |
|---|---|---|---|---|---|---|---|---|---|
|  |  | single-layer winding | two-layer winding | single-layer winding | two-layer winding | single-layer winding | two-layer winding | single-layer winding | two-layer winding |
| n = 1 |  | Z = 8<br>2p = 2/6/10 | Z = 4<br>2p = 2/6 | Z = 12<br>2p = 2/10/14<br>oder<br>Z = 6<br>2p = 2/4/8 | Z = 6<br>2p = 2/10<br>oder<br>Z = 3<br>2p = 2/4 | Z = 16<br>2p = 14/18 | Z = 8<br>2p = 6/10 | Z = 20<br>2p = 18/22 | Z = 5<br>2p = 4/6<br>oder<br>Z = 10<br>2p = 6/14 |

-continued

|  | 2 strands | | 3 strands | | 4 strands | | 5 strands | |
|---|---|---|---|---|---|---|---|---|
|  | single-layer winding | two-layer winding | single-layer winding | two-layer winding | single-layer winding | two-layer winding | single-layer winding | two-layer winding |
| n = 2 | Z = 16<br>2p = 2/14/18 | Z = 8<br>2p = 6/10 | Z = 24<br>2p = 2/22/26 | Z = 12<br>2p = 10/14<br>oder<br>Z = 6<br>2p = 4/8 | Z = 32<br>2p = 30/34 | Z = 16<br>2p = 14/18 | Z = 40<br>2p = 38/42 | Z = 10<br>2p = 8/12<br>oder<br>Z = 20<br>2p = 18/22 |
| n = 3 | Z = 24<br>2p = 2/22/26 | Z = 12<br>2p = 10/14 | Z = 36<br>2p = 2/34/38 | Z = 18<br>2p = 14/22<br>oder<br>Z = 9<br>2p = 8/10 | Z = 48<br>2p = 46/50 | Z = 24<br>2p = 22/26 | Z = 60<br>2p = 58/22 | Z = 15<br>2p = 14/16<br>oder<br>Z = 30<br>2p = 26/34 |
| n = 4 | Z = 32<br>2p = 2/30/34 | Z = 16<br>2p = 14/18 | Z = 48<br>2p = 2/46/50 | Z = 12<br>2p = 10/14<br>oder<br>Z = 24<br>2p = 22/26 | Z = 64<br>2p = 62/66 | Z = 32<br>2p = 30/34 | Z = 80<br>2p = 78/82 | Z = 20<br>2p = 18/22<br>oder<br>Z = 40<br>2p = 38/42 |

Preferably, the doubling of the number of the notches is not related to one given pole pair number only, but is further related to a given number of strands and the number n of the coils of a strand around neighboring teeth.

It is possible, for example, that 2 coils of one strand are provided on teeth in neighboring relationship, followed by another phase.

The suggested combination of the doubling of the number of notches with a differing number of turns of windings in a notch allows to eliminate in particular the harmonic components with a low harmonic order virtually to zero.

In particular the harmonic component with the harmonic order of 1, occurring as a sub-harmonic component whenever a higher harmonic is used as the operating wave, may be significantly reduced with the suggested principle.

The number of turns of the first electrical winding may range in an interval between and including 0.5 and 1, multiplied by the number of turns of the second electrical winding.

It is further preferred that a first winding and a second winding are arranged in each notch of the stator, these windings having differing numbers of turns.

The doubling of the number of notches in the stator is preferably related to the required minimum number of notches for a winding topology comprising a winding with two partial windings in which the partial windings are electrically connected to each other and mechanically shifted relative to each other. Incidentally, the two partial windings preferably have the same topology. Each of the partial windings may have the same winding distribution, for instance for twelve notches and ten poles.

The two partial windings may be connected in series to each other, for example.

It is preferred that the first and second partial windings are arranged in different notches of the stator.

The first and second partial windings, taken alone, are each constructed as a concentrated winding, while it is preferred that, in each partial winding, one tooth remains unoccupied between winding-carrying teeth of this partial winding.

This preferably results in an overlapping winding to the effect that each partial winding is wound around two teeth of the stator.

A combination of e.g. two twelve/ten type partial windings, i.e. related to 12 notches and 10 poles, results in a topology with 24 notches in the stator and ten poles in the rotor. Consequently, with respect to the topology of a partial winding, the number of notches is doubled with the pole pair number remaining unchanged.

In one embodiment, each winding is arranged so as to surround at least two neighboring teeth of the stator such that each winding leaves a notch unoccupied between these teeth. It is preferred that the windings of the second partial winding are placed in these unoccupied notches of the first partial winding such that the windings of the two partial windings alternate along the stator in the notches in a periodic manner.

The stator preferably has a three-phase winding. Thus, the electrical machine designed in such a manner may be connected to an electrical three-phase system. As an alternative, 2, 4, 5 or more phases or strands are also possible.

Alternatively or additionally, the electrical machine may comprise one of the following types: linear machine, axial-flux type machine, radial-flux type machine, asynchronous machine, synchronous machine.

The electrical machine may be constructed as a machine with internal rotor or as a machine with external rotor.

The rotor of the suggested electrical machine may be one of the following types, for instance: a cage rotor, a multi-layered rotor in the case of the asynchronous machine, or a permanent-magnet rotor in the case of the synchronous machine, a rotor with buried magnets or an electrically supplied rotor such as a full-pole type rotor, salient-pole type rotor, heteropolar rotor, homopolar rotor.

Two neighboring notches form between them one tooth of the stator. This tooth has a tooth width which is defined by the distance of the neighboring notches. Preferably, at least two teeth of the stator have differing tooth widths.

It is further preferred that teeth with a first tooth width and a second tooth width which form a pair of teeth periodically alternate along the stator, i.e. along the circumference of the stator when designed as a rotating machine.

All notches of the stator preferably have the same width between neighboring teeth.

In another embodiment, an electrical machine comprises a stator including a plurality of notches for receiving electrical windings as well as a rotor which can be moved relative to the stator. The stator has a doubled number of notches with respect to a required minimum number of notches for a given pole pair number of the rotor. The distance of neighboring notches defines a tooth width of a first tooth of the stator. Likewise, a tooth width of a second tooth of the stator is defined in an analogous fashion. First and second tooth widths differ from each other here.

This allows reducing higher harmonic components of the magnetomotive force in operation of the machine to zero, in particular those in the vicinity of that component of the magnetomotive force which is used as the operating wave. To give an example, when the fifth harmonic component is utilized as the operating wave, the seventh harmonic component can be reduced to zero. Vice versa, when the seventh harmonic component is used as the operating wave, then the fifth harmonic component can be reduced to zero.

The tooth width of the first tooth may amount to, for instance, 50% or a value of between 50% and 100% of the tooth width of the second tooth.

Teeth of different tooth widths may be arranged, for example, so as to periodically alternate along a working direction of the stator. When the machine is designed as a linear motor, a working direction is to be understood as a longitudinal direction along which the rotor moves relative to the stator. In case the machine is configured as a rotating machine, this is the circumference of the rotor.

The doubling of the number of notches in the stator is preferably related to the required minimum number of notches for a winding topology which comprises a winding with two partial windings in which the partial windings are electrically connected to each other and mechanically shifted relative to each other. Incidentally, the two partial windings preferably have the same topology. Each of the partial windings may have the same winding distribution, for instance for twelve notches and ten poles. The stator winding may be designed with several layers.

Preferably, the two partial windings are connected in series to each other.

The first and second partial windings are preferably arranged in different notches of the stator.

A combination of e.g. two twelve/ten type partial windings results in a topology with 24 notches in the stator and ten poles in the rotor. Consequently, with respect to the topology of a partial winding, the number of notches is doubled with an unchanged pole pair number.

In one embodiment, each winding is arranged so as to surround at least two neighboring teeth of the stator such that each winding leaves a notch between these teeth unoccupied. It is preferred that the windings of the second partial winding are placed in these unoccupied notches of the first partial winding such that the windings of the two partial windings periodically alternate along the stator preferably in the notches.

The stator preferably has a three-phase winding. Thus, the electrical machine of such design may be connected to an electrical three-phase system.

The rotor may be a cage rotor, a multilayered rotor, a permanent-magnet rotor, a rotor with buried magnets or a combination of these rotor types, for instance, as far as they do not mutually exclude one another in technical terms.

The suggested electrical machine may be constructed as a machine with internal rotor or as a machine with external rotor.

Further, the electrical machine may be constructed not only as a rotating machine, but alternatively also as a linear motor or linear generator, as an axial-flux type motor or another type. The machine may be a synchronous machine or an asynchronous machine.

In a further embodiment, the described electrical machine may be combined with the one having windings with differing numbers of coils in a notch of the stator, as explained above.

This allows to combine the advantages of the two described embodiments with each other.

As a whole, the suggested principle allows reducing or eliminating all relevant undesired components of the Fourier decomposition of the magnetomotive force of an electrical machine of the type described to such an extent that virtually no undesired acoustic impairments by the machine occur in operation and, in addition, the losses of the machine are significantly reduced.

This is why the suggested electrical machine is preferably suited for being used in the drive system in electrically operated vehicles, in particular in hybrid vehicles, but is not limited to this application.

The described features of the two explained embodiments may be combined among each another.

BRIEF DESCRIPTION OF THE DRAWINGS

The invention will be explained in more detail below on the basis of several exemplary embodiments with the aid of drawings. In doing so, identical parts or parts having the same effect are provided with identical reference numerals.

FIG. 2A shows an exemplary embodiment of the invention with a differing number of turns per phase winding in a cut-out as well as an exemplary illustration of the winding distribution, FIG. 3D shows a comparison of the diagrams of FIG. 3C and FIG. 1C, FIG. 6D shows a comparison of the diagram of FIG. 6C with a conventional machine, FIG. 10 shows a further exemplary comparison of the Fourier decomposition in which differing tooth widths and differing numbers of turns are combined.

DETAILED DESCRIPTION OF THE DRAWINGS

Figure 1A:
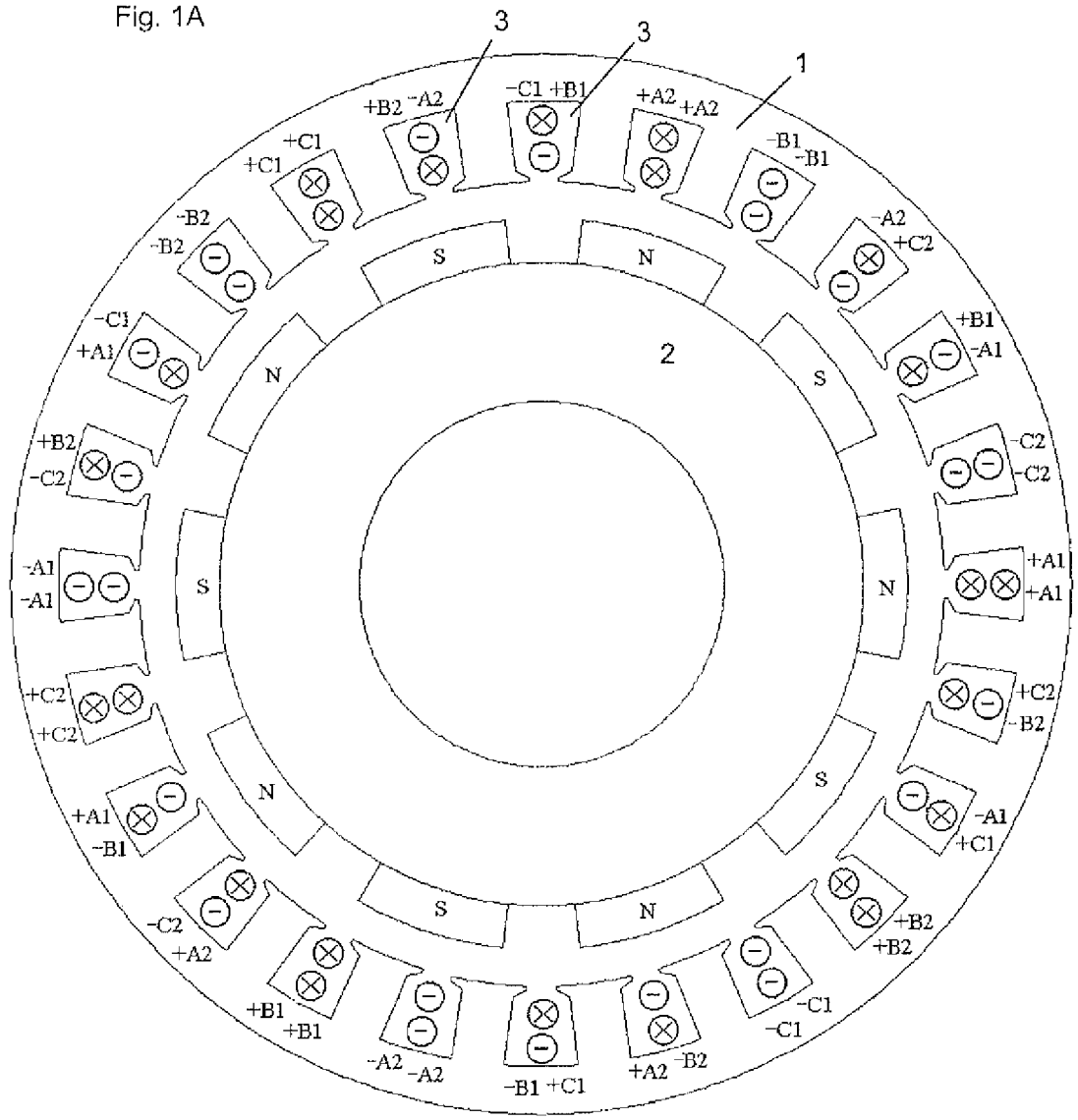
FIG. 1A shows an electrical machine in cross-section for a winding topology with 24 notches and ten poles.

FIG. 1A shows an exemplary embodiment of an electrical machine comprising a stator 1 and a rotor 2. The stator is formed with a total of 24 notches of identical geometry between which 24 teeth are provided. The rotor 2 has a pole pair number of five and hence a pole number of ten, comprising five south poles S and five north poles N.

The winding in the stator comprises a two-layered three-phase winding, with the electrical phases being referred to as phase A, phase B and phase C. The winding sense is indicated with plus (+) and minus (−), respectively. The windings each comprise two partial windings, the first partial winding being designated with 1 and the second partial winding with 2. Here, the symbols are composed of the winding sense, the phase and the partial winding. To give an example, +C1 indicates a positive winding of the third phase C of the first partial winding 1. The first and second partial windings are alternately arranged in the notches along the circumference. Thus, the first and the second partial windings are accommodated in independent stator notches. The partial windings are serially connected to each other in each phase. Moreover, the two partial windings are shifted relative to each other by a rotation angle $\alpha$.

Compared with an accommodation of both partial windings in a total of only twelve notches, the invention has the advantage that a more discretized shifting between the two partial windings is possible due to the doubled number of the notches. This allows a significant reduction of the seventh harmonic component, for instance with a selected utilization of the fifth harmonic component as the operating wave. The fifth harmonic component remains unaffected, so to speak. Here, the shifting angle $\alpha_w$ amounts to:

$$\alpha_w = 2.5 * \alpha_\tau = 5 * \alpha_\tau',$$

with $\alpha_\tau = 2 * \alpha_\tau'$, and wherein $\alpha_\tau$ is the angular distance of two neighboring notches with a conventional construction with twelve notches in the stator, and $\alpha_\tau'$ is the angular distance of two neighboring notches when designed with 24 notches according to the example of FIG. 1A.

In alternative embodiments, the partial windings could be connected to each other in another way instead of being connected in series.

Figure 1B:
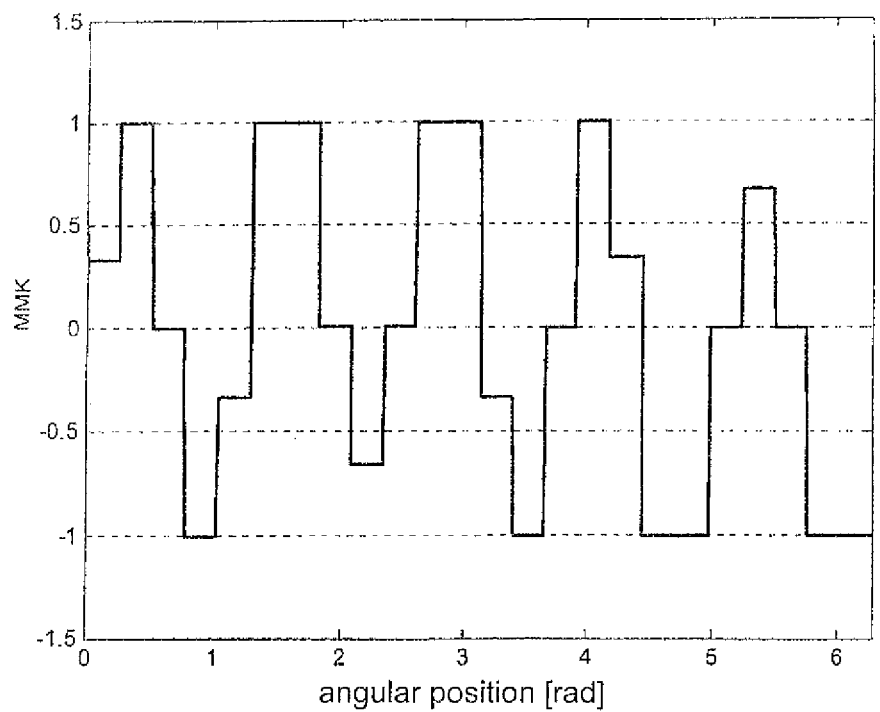
FIG. 1B shows an associated exemplary diagram of the magnetomotive force versus the angular position.
Figure 1C:
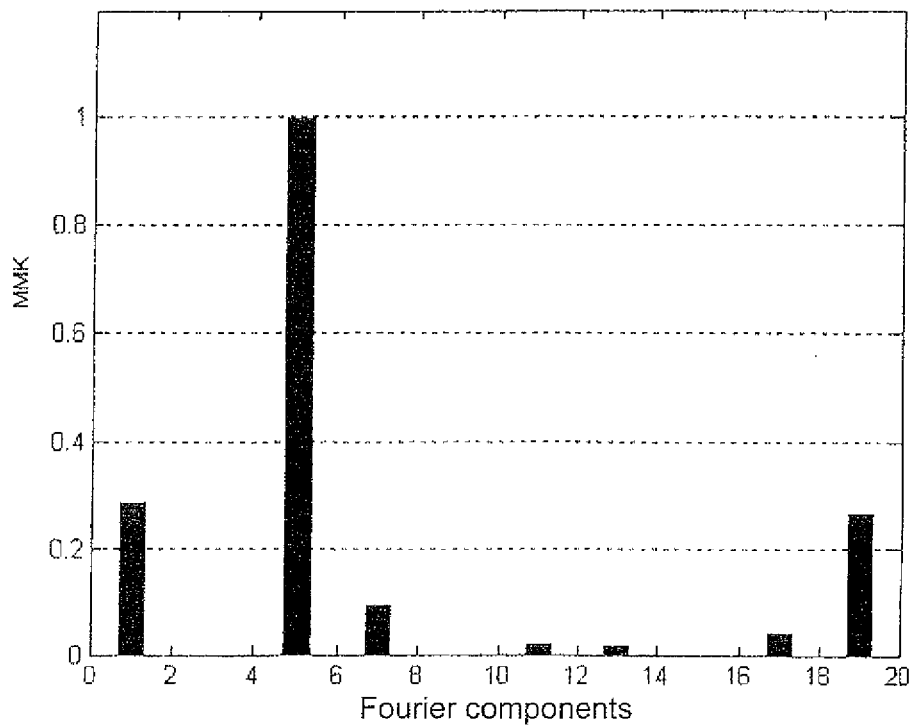
FIG. 1C shows an associated exemplary diagram of the magnetomotive force versus the Fourier components.

FIGS. 1B and 1C show the magnetomotive force plotted versus the angular position in angular degrees and versus the higher harmonic components of the Fourier decomposition, respectively. It is to be seen on the basis of the diagram of FIG. 1C that—with standardization to the fifth harmonic component as the operating wave—the first sub-harmonic as well as the nineteenth harmonic component are still visible; the seventh harmonic component, however, is markedly reduced.

Figure 1D:
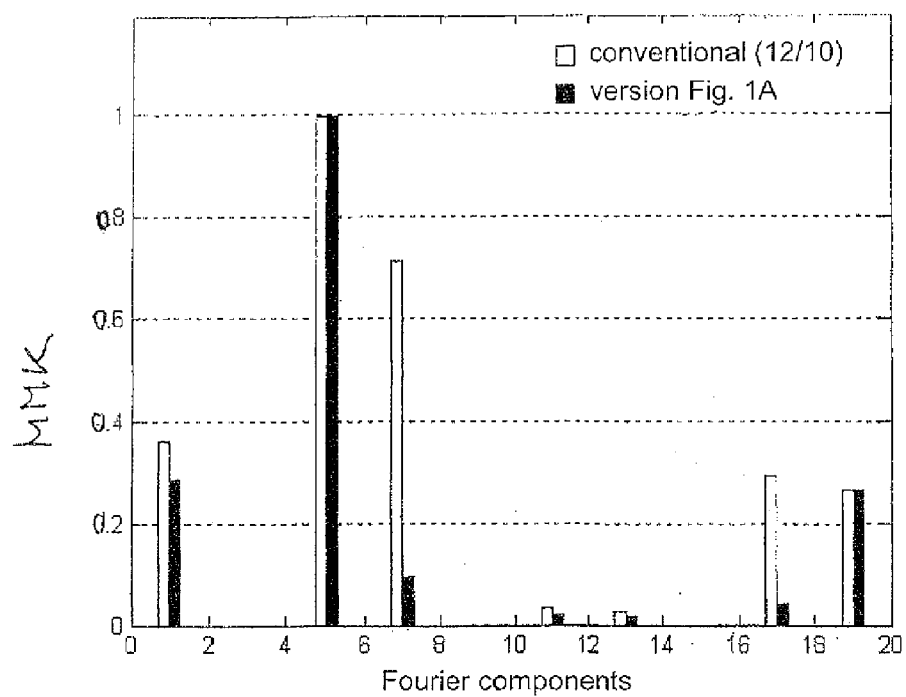
FIG. 1D shows a comparison between FIG. 1C and a conventional design.

FIG. 1D shows this comparison between the Fourier decomposition according to FIG. 10 for a conventional design of the machine with 12 teeth and 10 poles.

In the upper half of the picture, FIG. 2A shows a first exemplary embodiment according to the invention in which differing numbers of turns of the windings exist in each notch in addition to the construction according to FIG. 1A, i.e. with 24 notches in the stator and ten poles in the rotor with two partial windings shifted relative to each other. Here, the symbols n1 and n2 designate the number of turns of a first electrical winding and a second electrical winding of the respective partial winding. In order to simplify the illustration, a realization in the form of a linear motor has been chosen by way of example instead of the rotating electrical machine of FIG. 1A.

The winding distribution is indicated in the lower half of the picture of the exemplary embodiment of FIG. 2A. For better understanding, merely one strand A among the three strands A, B, C has been drawn in. It is to be seen that each winding is wound around two teeth in each case. Moreover, the windings with an equal number of turns are accommodated in the respective notch in an alternating top and bottom arrangement.

It is remarkable that, in this embodiment, windings with an identical number of turns not always appear in an alternating manner in the direction of motion of the rotor. The windings rather are accommodated according to the scheme n2-n1-n1-n2.

The winding-A1 carrying the $2^{nd}$ turn number n2 and accommodated in the first notch from the left in the upper position appears again in the third notch in the lower position. On top of it, a winding with the $1^{st}$ turn number n1 is accommodated, being visible in the $5^{th}$ notch in the lower position. In the notch next to it, i.e. the $6^{th}$ notch, likewise a winding with the $1^{st}$ turn number n1 is accommodated following this principle, but in the upper position. This winding is illustrated at the bottom in the $8^{th}$ notch. The overlying winding in this notch again has the $2^{nd}$ turn number n2 and appears in the rightmost notch in the lower position.

According to this approach windings with an identical number of turns of a strand are spaced in the direction of motion of the rotor by respectively two windings of another turn number of the same strand.

The remaining strands B, C are wound in analogous fashion to strand A.

In the English language, a strand is also referred to as phase.

As an alternative to the winding topology n2-n1-n1-n2 which has been shown, it is possible to carry out the winding process with differing numbers of turns according to the topology n1-n2-n1-n2.

Figure 2B:
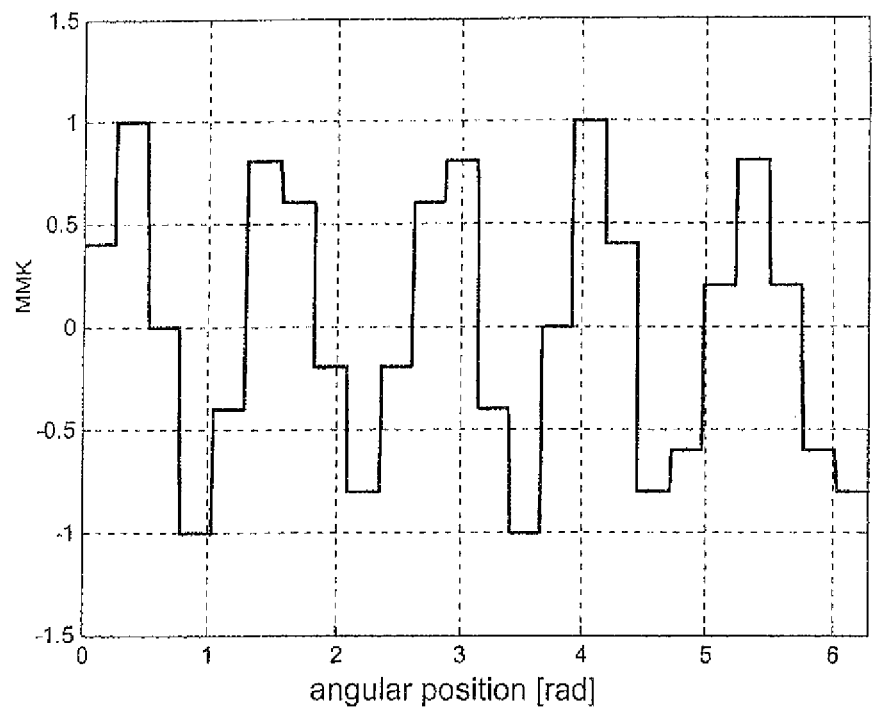
FIG. 2B shows the associated diagram of the magnetomotive force versus the angular position.
Figure 2C:
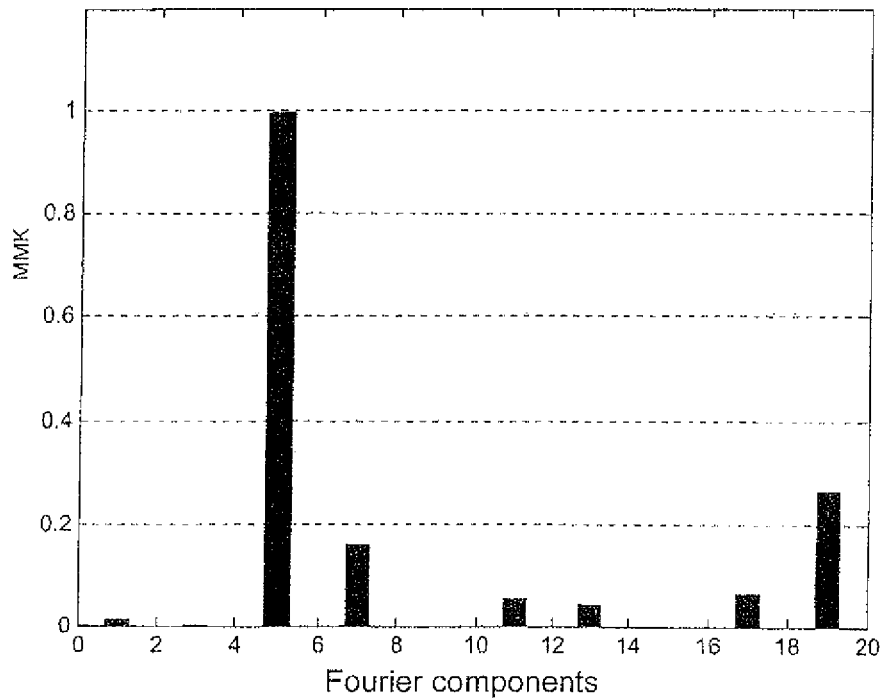
FIG. 2C shows the associated diagram of the magnetomotive force versus the Fourier components.

As can be taken from the diagrams of the magnetomotive force versus the angular position and versus the harmonic components according to FIGS. 2B and 2C, respectively, it is possible with this measure to achieve a combination together with a reduction of the first sub-harmonic component, in addition to the significant reduction of the seventh harmonic component. This allows a significant improvement of the efficiency, on the one hand, and of the generation of noise of the electrical machine in the relevant frequency range, on the other hand.

Figure 2D:
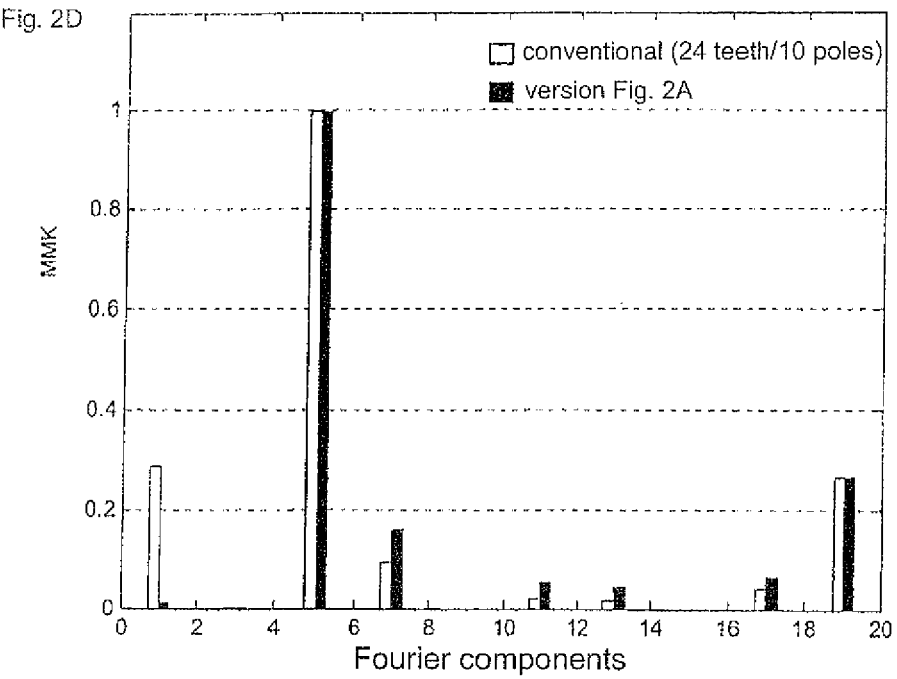
FIG. 2D shows a comparison of FIG. 2C with FIG. 1C.

FIG. 2D graphically shows a comparison of FIGS. 1C and 2C with respect to the distribution of the magnetomotive force.

Figure 3A:
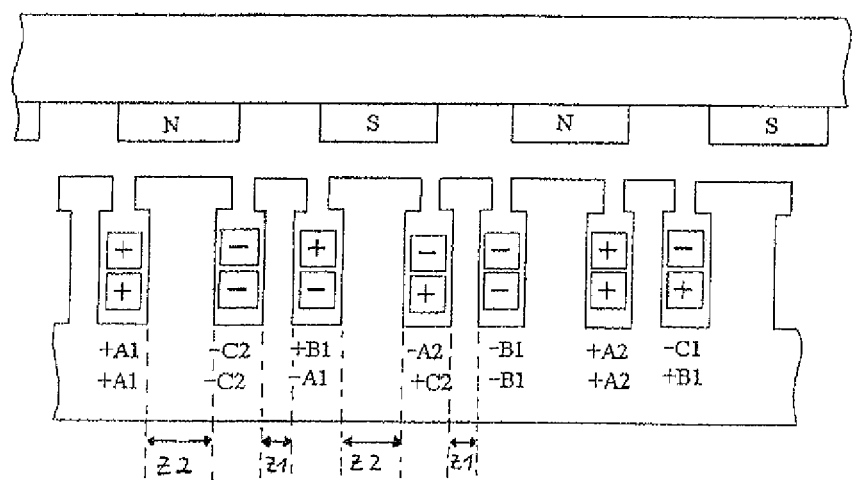
FIG. 3A shows an exemplary embodiment of an electrical machine with differing tooth widths in a cut-out.

FIG. 3A shows another exemplary embodiment on the basis of the topology of FIG. 1A, in which an electrical machine comprising 24 notches in the stator and ten poles in the rotor is further developed to the effect that neighboring teeth in the stator have differing tooth widths. The notches for receiving the windings all have the same width across the stator. The teeth in the stator which are formed between neighboring notches have different tooth widths per pair in each case, these pairs of different tooth widths periodically repeating across the stator. With this design, the number of turns of all windings are identical.

Figure 3B:
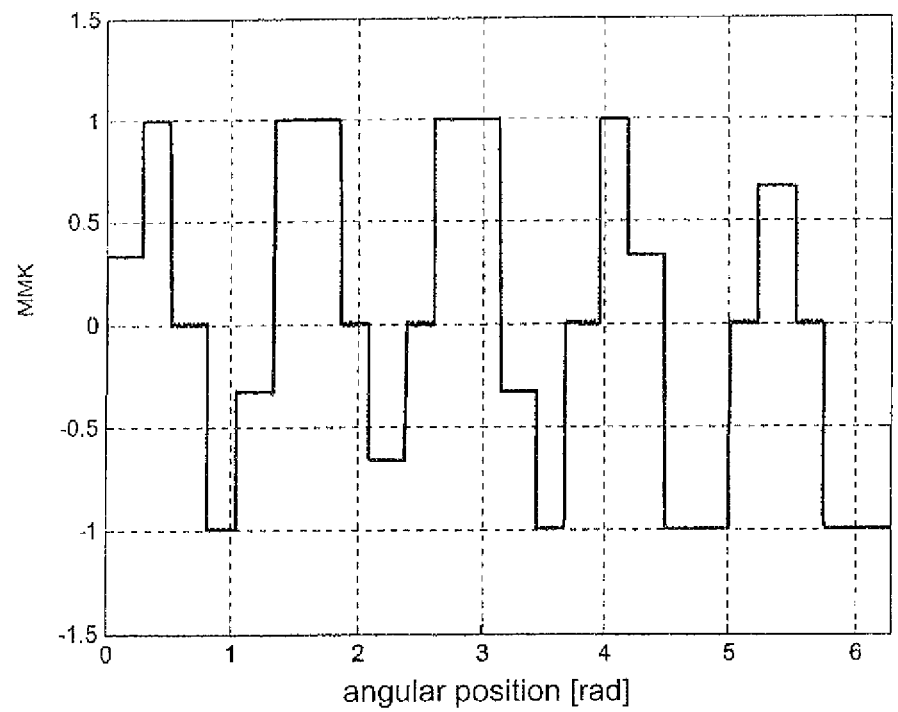
FIG. 3B shows the associated diagram of the magnetomotive force versus the angular position.
Figure 3C:
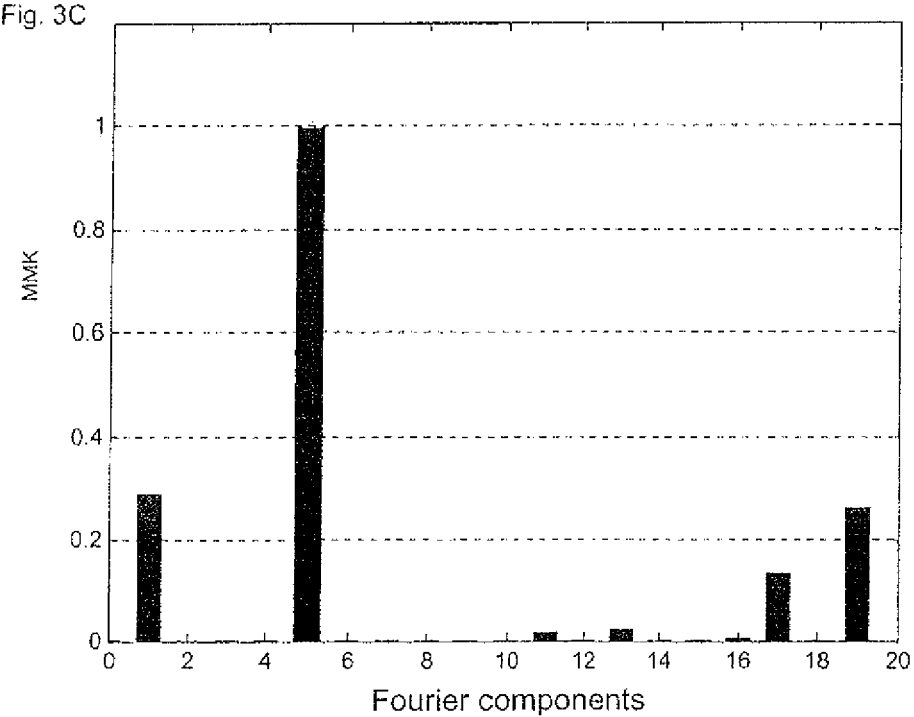
FIG. 3C shows the associated diagram of the magnetomotive force versus the Fourier components.

The advantageous effect of this design is obvious from the diagrams of the magnetomotive force, again plotted once versus the angular position in FIG. 3B and once versus the distribution of the components in FIG. 3C.

FIG. 3D shows that the seventh harmonic component is virtually reduced to zero by means of this measure.

Figure 4:
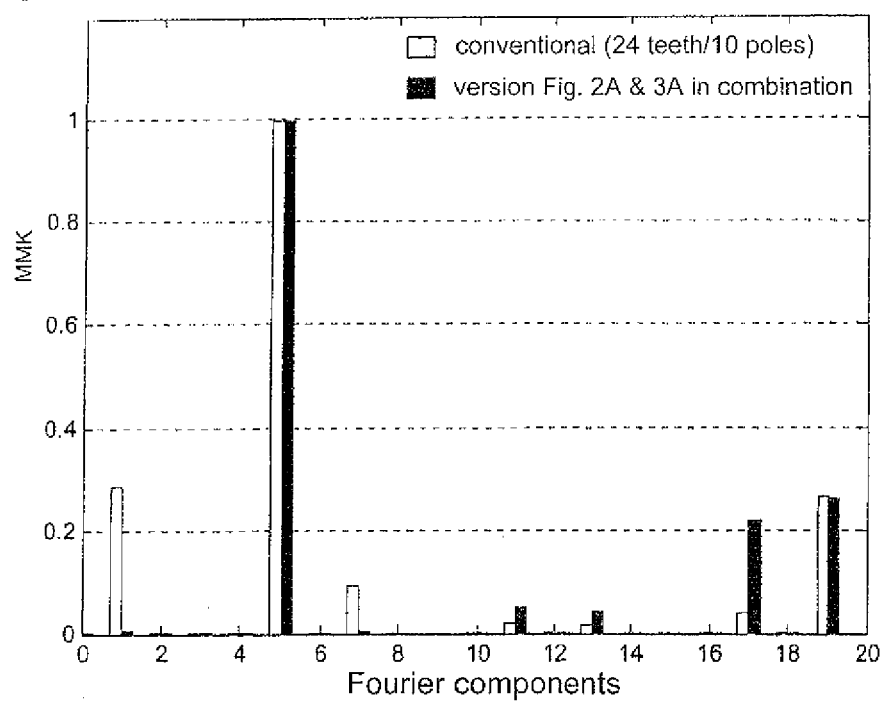
FIG. 4 shows a comparison of an embodiment when combining the features of FIGS. 2A and 3A with the diagram of FIG. 1C in a diagram of the magnetomotive force versus the Fourier components thereof.

Combining the differing numbers of turns according to the design of FIG. 2A with the differing tooth widths according to FIG. 3A results in the success which is shown in FIG. 4 by means of the comparison with the initial topology according to FIG. 1A. Still having the topology with 24 notches in the stator and ten poles in the rotor, different numbers of turns of the windings per notch and the stator with different tooth widths, the success arises that the first to the fourth sub-harmonic components have practically disappeared, the fifth harmonic component utilized as the operating wave is normalized to one and the seventh, higher harmonic component has likewise practically disappeared.

Thus, a still greater improvement of the efficiency and the acoustic properties of the electrical machine in operation is achieved with the proposed measures, making possible with additional advantage especially the use in electrical drive systems as is required in hybrid vehicles.

Figure 5A:
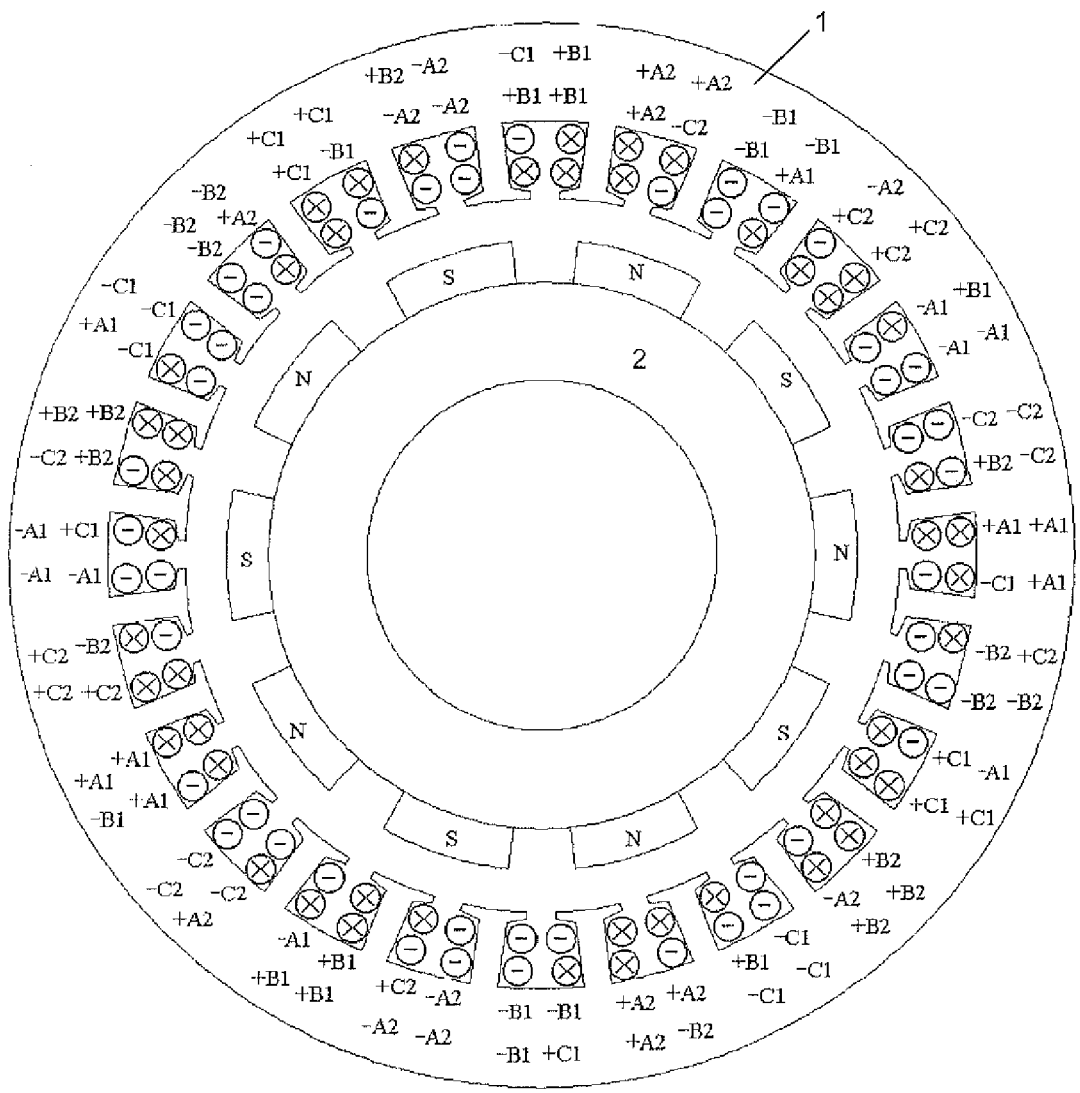
FIG. 5A shows an exemplary embodiment with a further subdivision of the windings of each phase in two sub-windings.

FIG. 5A shows a further exemplary embodiment according to the invention starting from the electrical machine according to FIG. 1A. Whereas in the exemplary embodiments according to FIGS. 1A to 4 two windings are arranged in each notch so as to be stacked, provision is made in FIG. 5A to divide the phase windings in two sub-windings and to arrange four windings per notch while maintaining the number of 24 notches.

The two partial windings which are mechanically shifted relative to each other, as explained on the basis of FIG. 1A, are arranged in FIG. 5A in different notches in alternating manner, too, and are additionally divided in two sub-windings. The first partial winding is mechanically shifted relative to the second partial winding, and also the sub-windings are mechanically shifted relative to each other. This allows reducing both the first and seventh undesired harmonic component in the decomposition of the magnetomotive force.

Figure 5B:
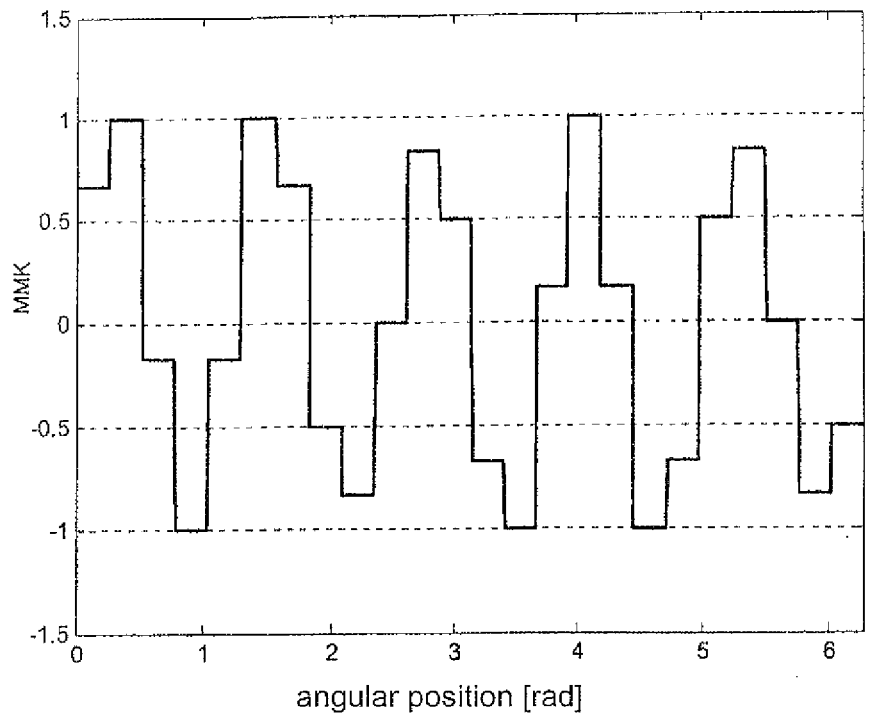
FIG. 5B shows the associated diagram of the magnetomotive force versus the angular position.
Figure 5C:
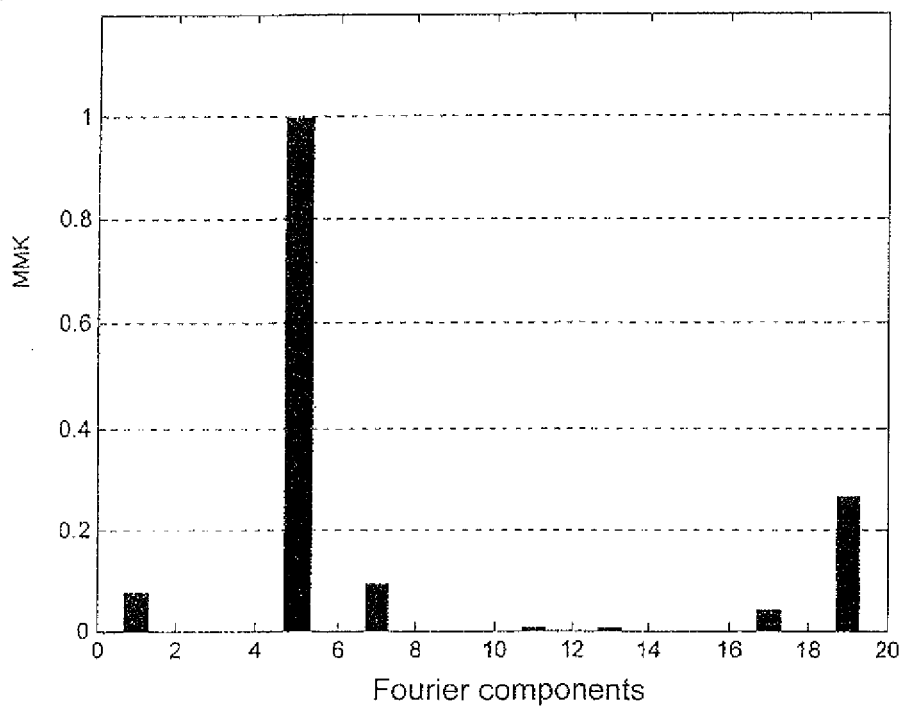
FIG. 5C shows the associated diagram of the Fourier components of the magnetomotive force.
Figure 5D:
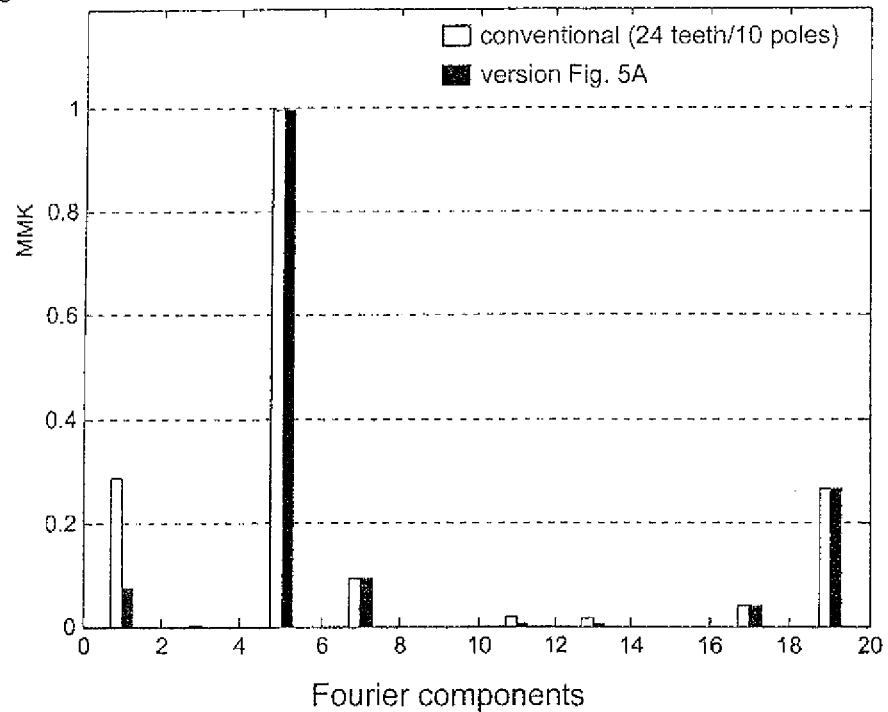
FIG. 5D shows a comparison of the distribution of the magnetomotive force of a machine according to FIG. 5A with a conventional machine.

This advantage is apparent from the diagrams of the FIGS. 5B to 5D.

Figure 6A:
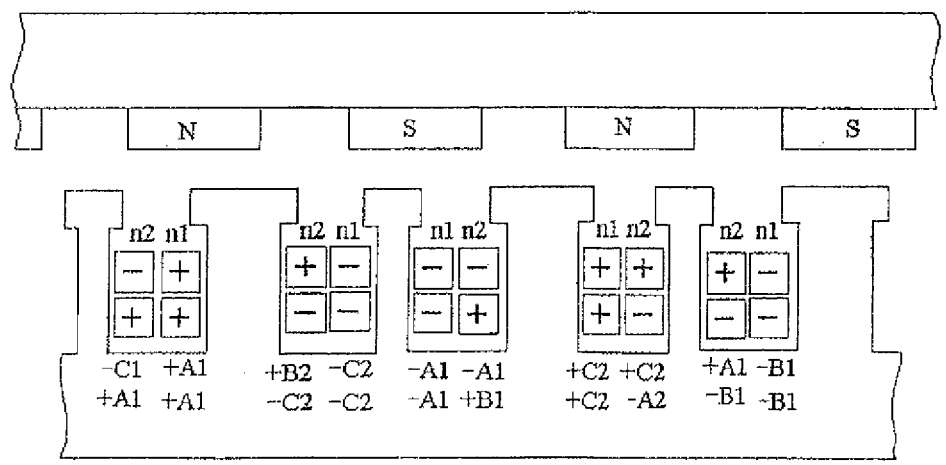
FIG. 6A shows an exemplary embodiment with differing numbers of turns per phase winding and differing tooth widths according to FIGS. 2A and 3A, additionally combined with the subdivision of the windings in sub-windings according to FIG. 5A.

FIG. 6A shows a combination of the winding topology and stator topology of FIG. 5A with the previously explained design of the phase windings with different numbers of turns on the one hand, and at the same time with differing tooth widths of the stator on the other hand, as is also described above.

Figure 6B:
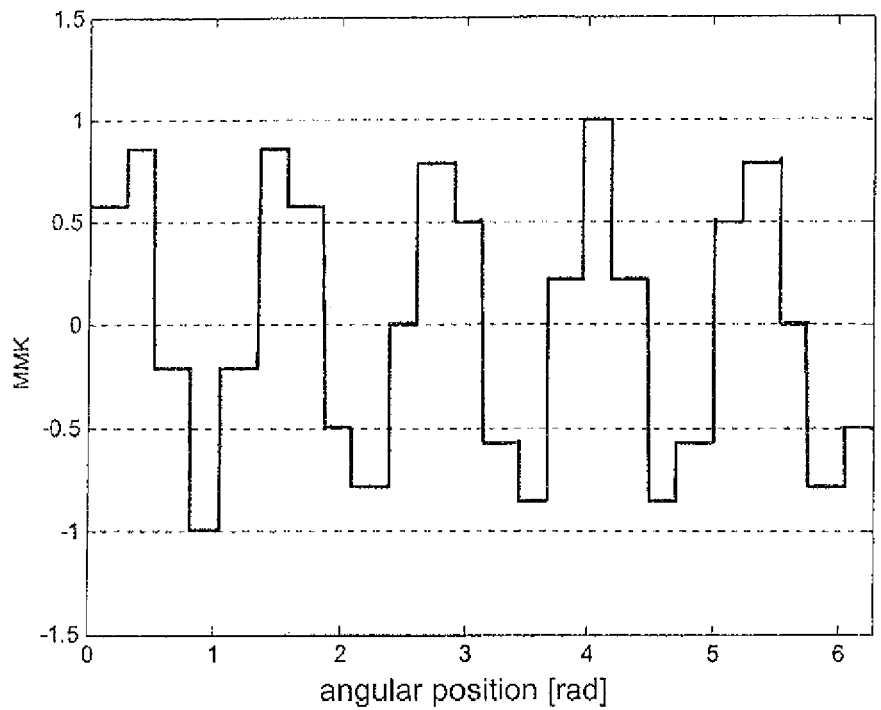
FIG. 6B shows an associated diagram of the magnetomotive force versus the angular position.
Figure 6C:
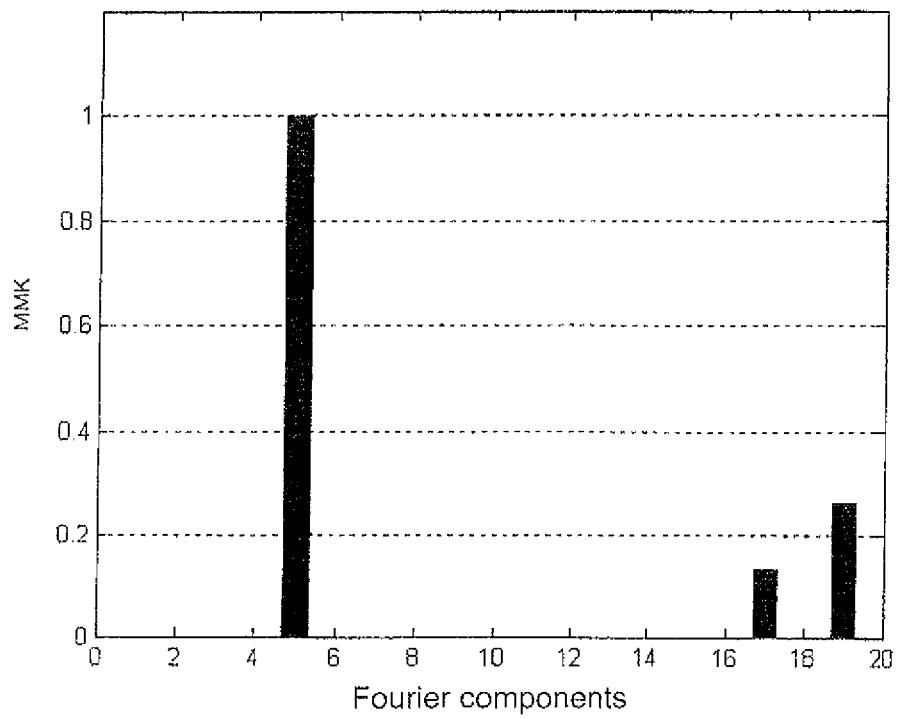
FIG. 6C shows an associated diagram of the magnetomotive force by means of the Fourier decomposition.

FIGS. 6B to 6D show the effects of this construction on the Fourier decomposition of the magnetomotive force; FIG. 6C graphically shows that, apart from the desired operating wave, no undesired harmonic components occur up to and including the sixteenth order.

Figure 7A:
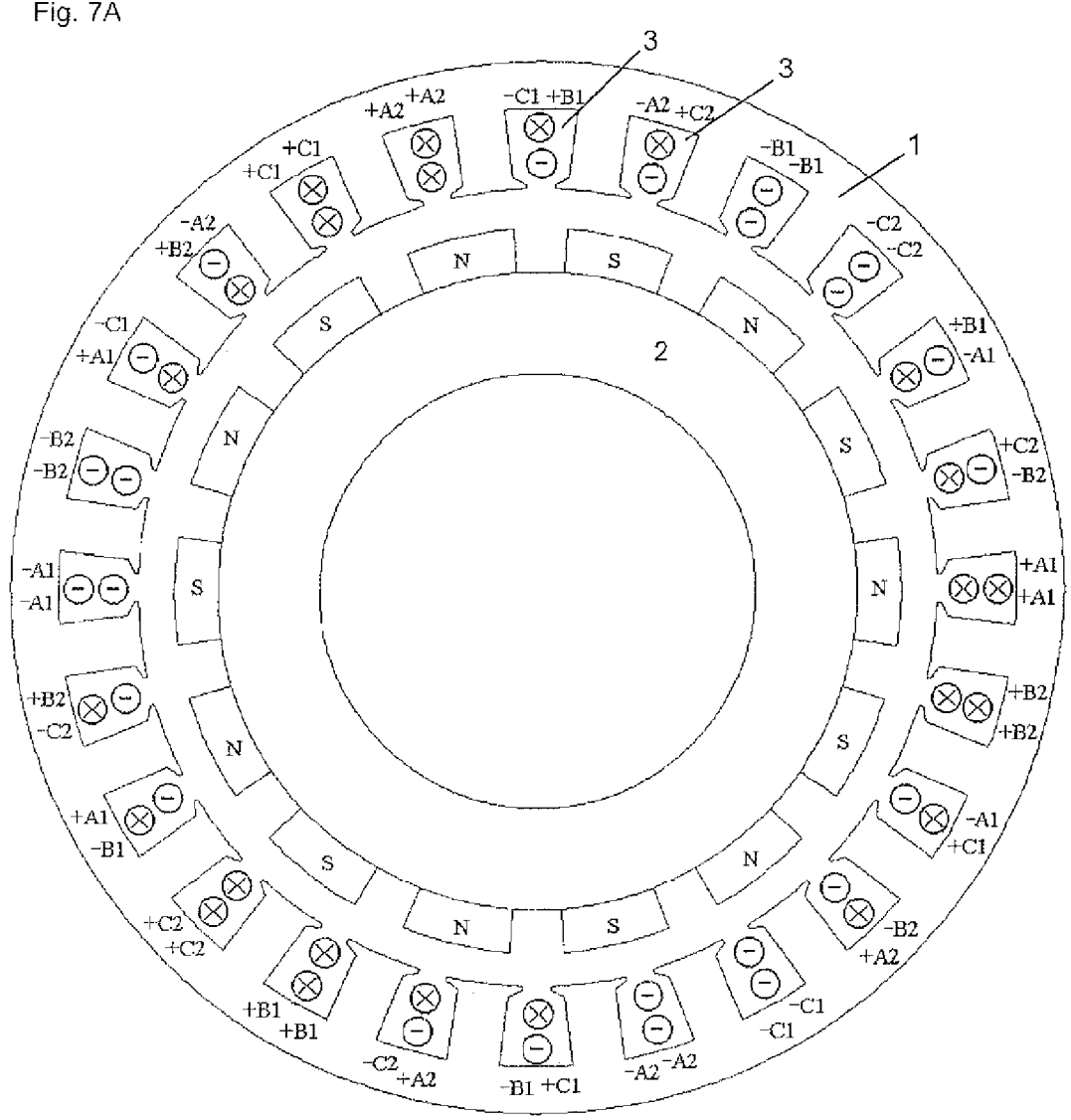
FIG. 7A shows the illustration of FIG. 1A, but in an exemplary design in terms of using the seventh harmonic component as the operating wave.

FIG. 7A shows an example of an alternative embodiment related to FIG. 1A. Compared with FIG. 1A, a pole pair number of 7 resulting in 14 poles is provided in the rotor of FIG. 7A. Consequently, the first and second serially connected partial windings in the stator exhibit a changed relative mechanical shifting than is the case with FIG. 1A, so as to be adapted to the different pole pair number. Thus, the partial windings are not shifted relative to each other by five notches as in FIG. 1A, but by seven notches.

Figure 7B:
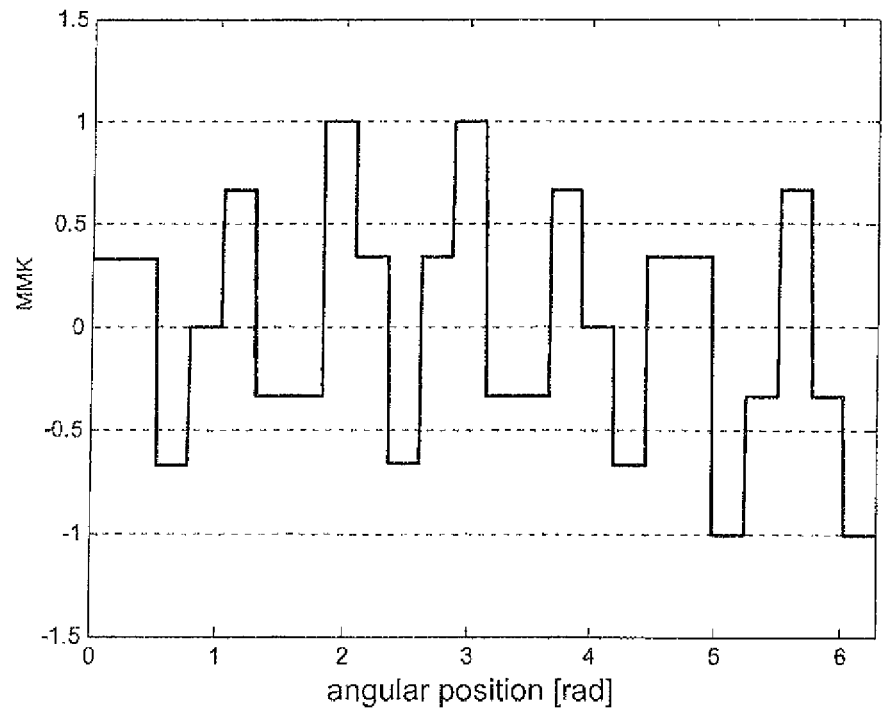
FIG. 7B shows the associated diagram of the magnetomotive force versus the angular position.
Figure 7C:
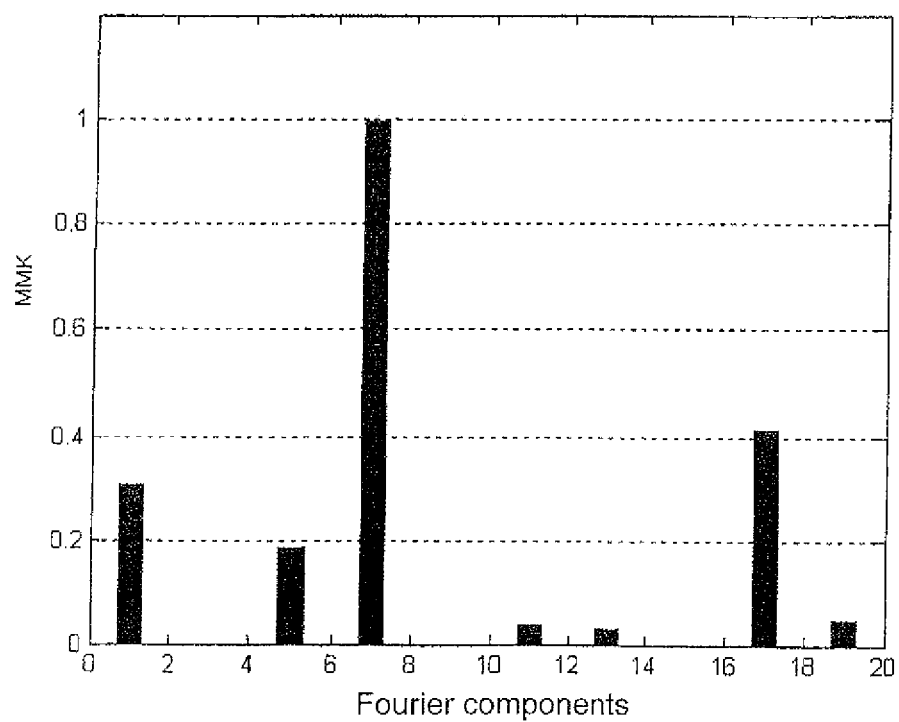
FIG. 7C shows the associated diagram of the Fourier component-based decomposition of the magnetomotive force.

FIGS. 7B and 7C show the advantageous effects of this design by means of the diagrams of the magnetomotive force versus the angular position, on the one hand, and with respect to the distribution of the harmonic Fourier components, on the other hand.

Figure 8A:
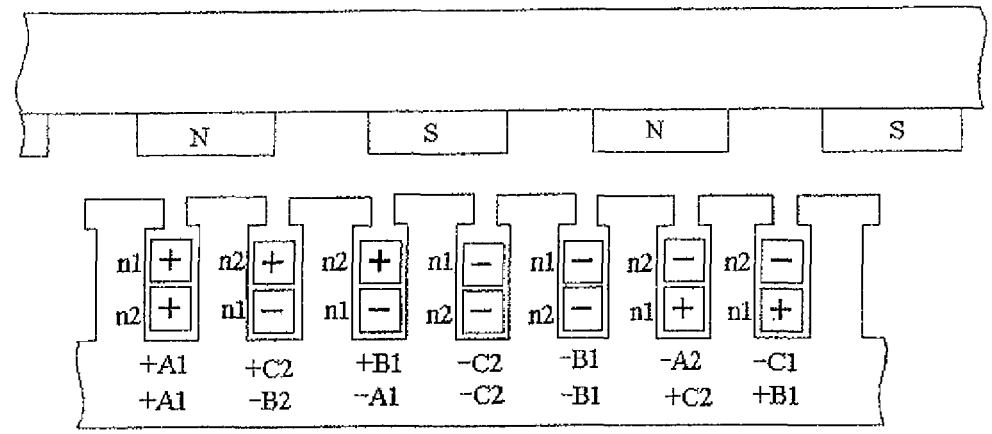
FIG. 8A shows an embodiment of the invention in which the seventh harmonic component is used as the operating wave and differing numbers of turns of the phase winding are provided.

FIG. 8A shows a further development of the embodiment according to FIG. 7A in which differing numbers of turns per phase winding are additionally employed. Similar to FIG. 2A, windings with differing numbers of turns are accommodated in each notch with FIG. 8A.

Figure 8B:
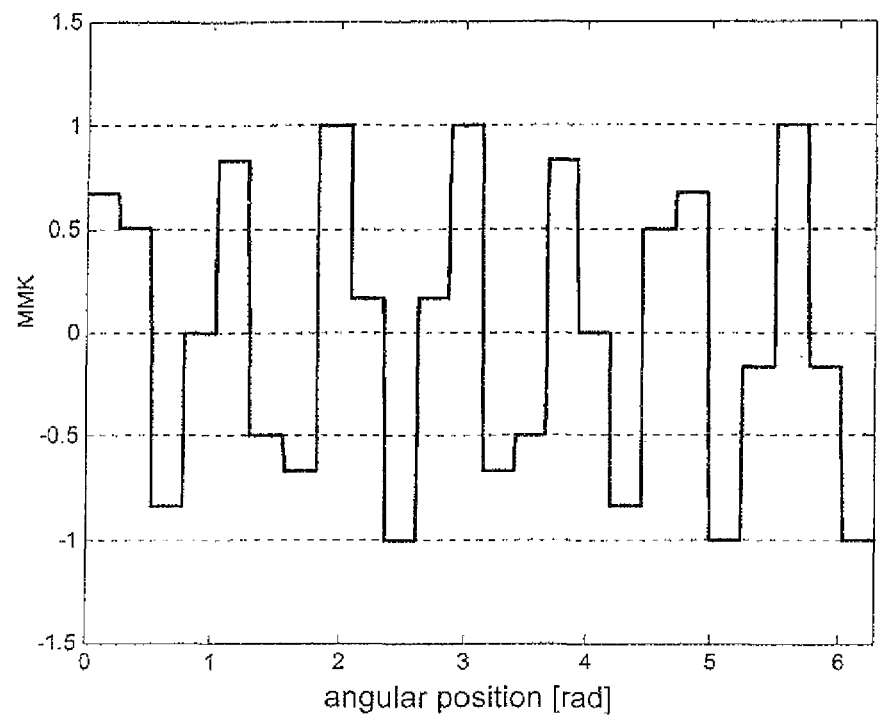
FIGS. 8B and 8C show the associated magnetomotive force by means of diagrams.
Figure 8C:
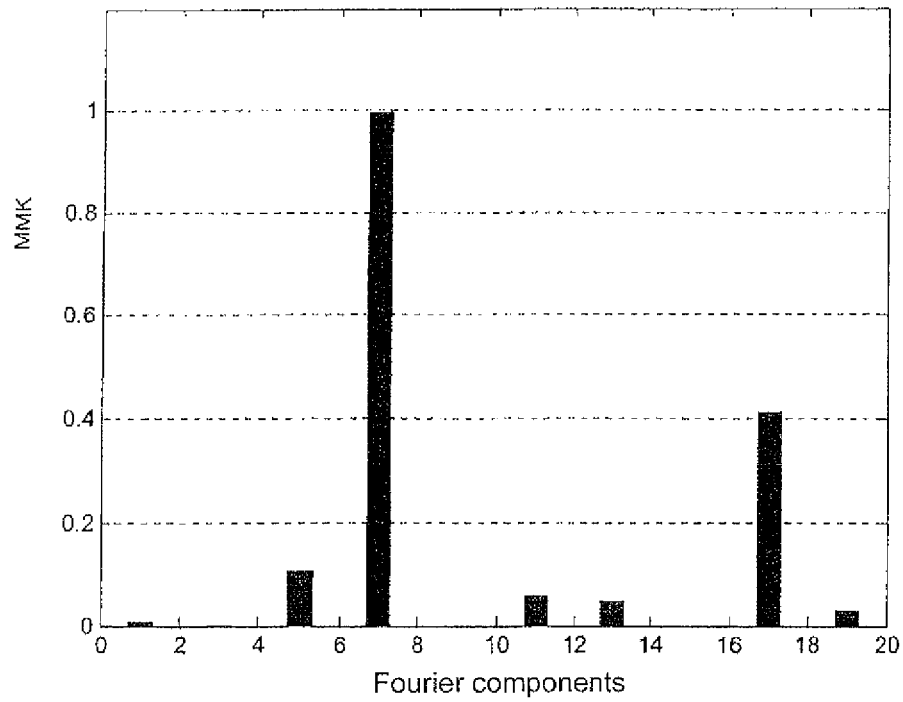
Figure 8D:
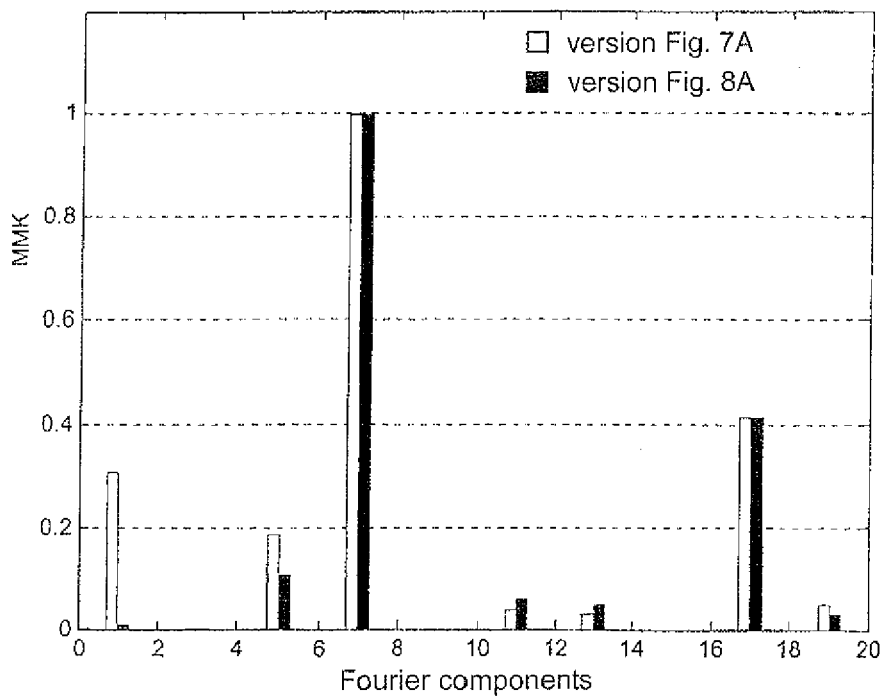
FIG. 8D shows a diagram of the magnetomotive force in its Fourier component decomposition as compared to the conventional machine.

FIGS. 8B to 8D demonstrate the effect of this approach. In FIG. 8C, the magnetomotive force is plotted versus the distribution of the higher harmonic components which clearly shows that the seventh harmonic component as the operating wave is standardized to one and related to this standardization the first sub-harmonic component has virtually disappeared.

Figure 9A:
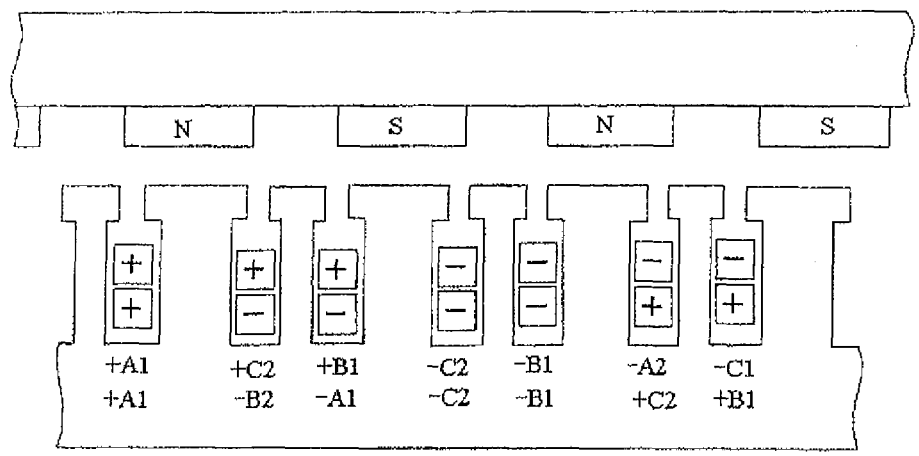
FIG. 9A shows an exemplary embodiment of a winding topology with 24 notches and 14 poles with differing tooth widths.

FIG. 9A shows another further development of the construction of FIG. 7A, in which the numbers of turns are equal in each case; instead, differing tooth widths are provided similar to FIG. 3A.

Figure 9B:
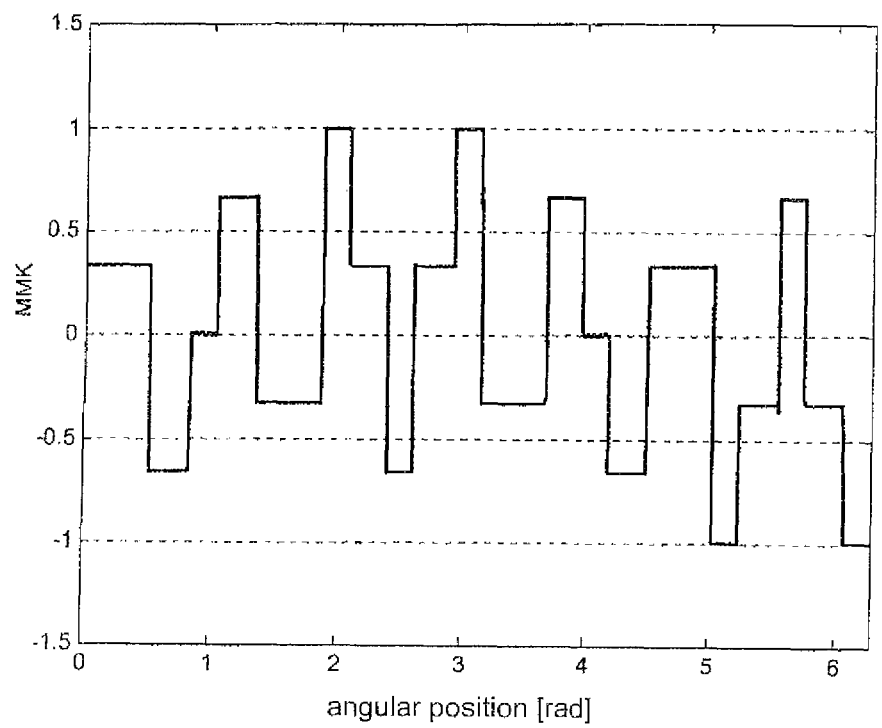
FIGS. 9B and 9C show associated diagrams of the magnetomotive force.
Figure 9C:
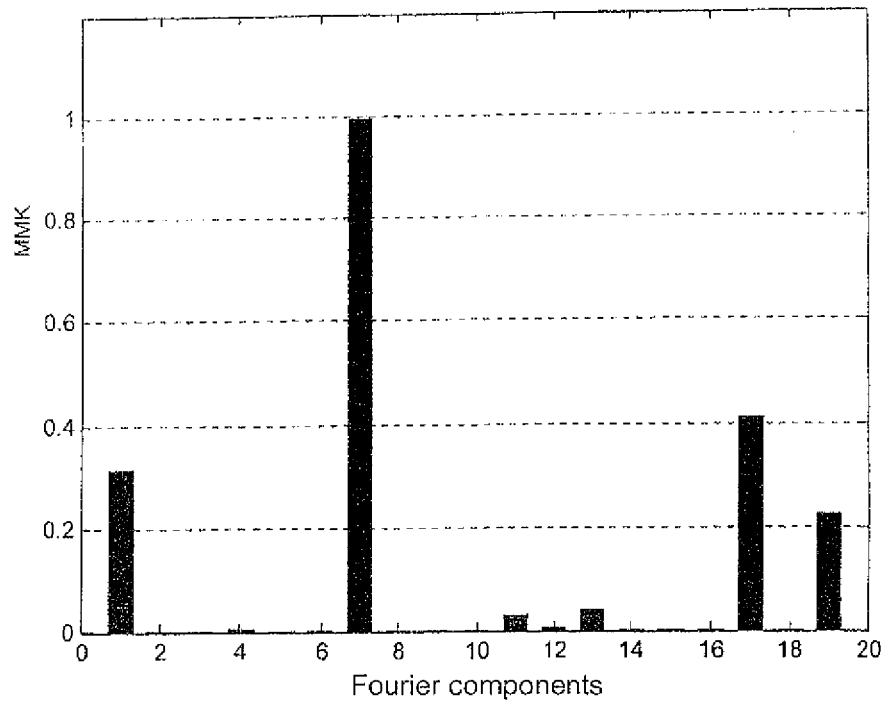
Figure 9D:
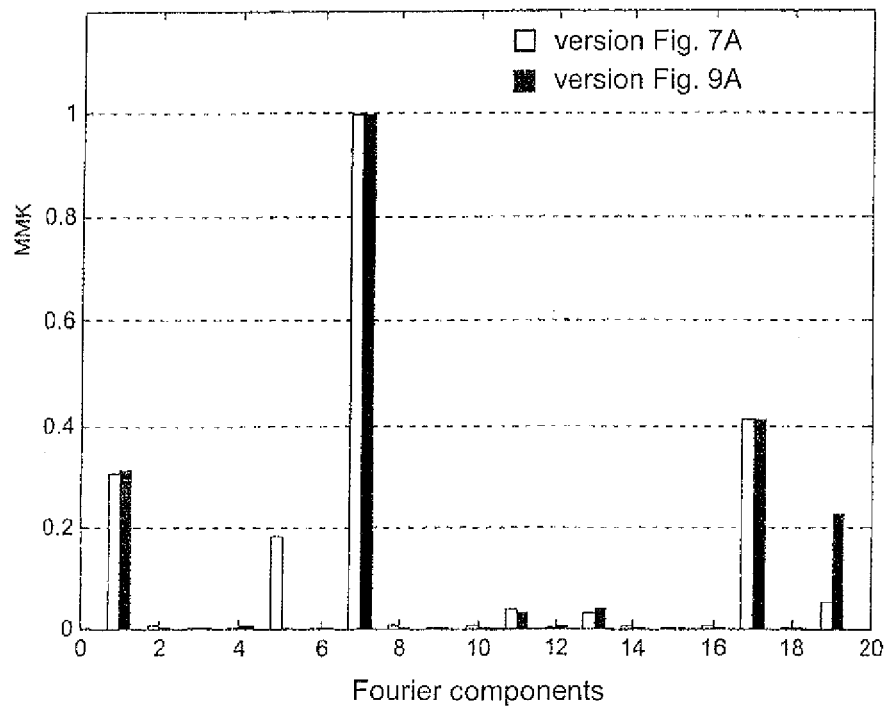
FIG. 9D shows a comparison of the diagram of FIG. 9C with that of FIG. 7C.

As is clear from the diagrams of FIGS. 9B to 9D, the undesired fifth harmonic component can be reduced significantly in relation to the standardized seventh harmonic component which serves as the operating wave here.

FIG. 10 describes a Fourier decomposition of an electrical machine in which, starting from the construction according to FIG. 7A, differing numbers of turns per phase winding are provided on the one hand, as shown in FIG. 8A, and, in addition, the tooth width is realized with different widths as in FIG. 9A. FIG. 10 graphically shows that this results in a reduction of the first and fifth undesired harmonic components so that virtually no undesired harmonic components occur in the region from the first to the tenth order apart from the operating wave.

Figure 11A:
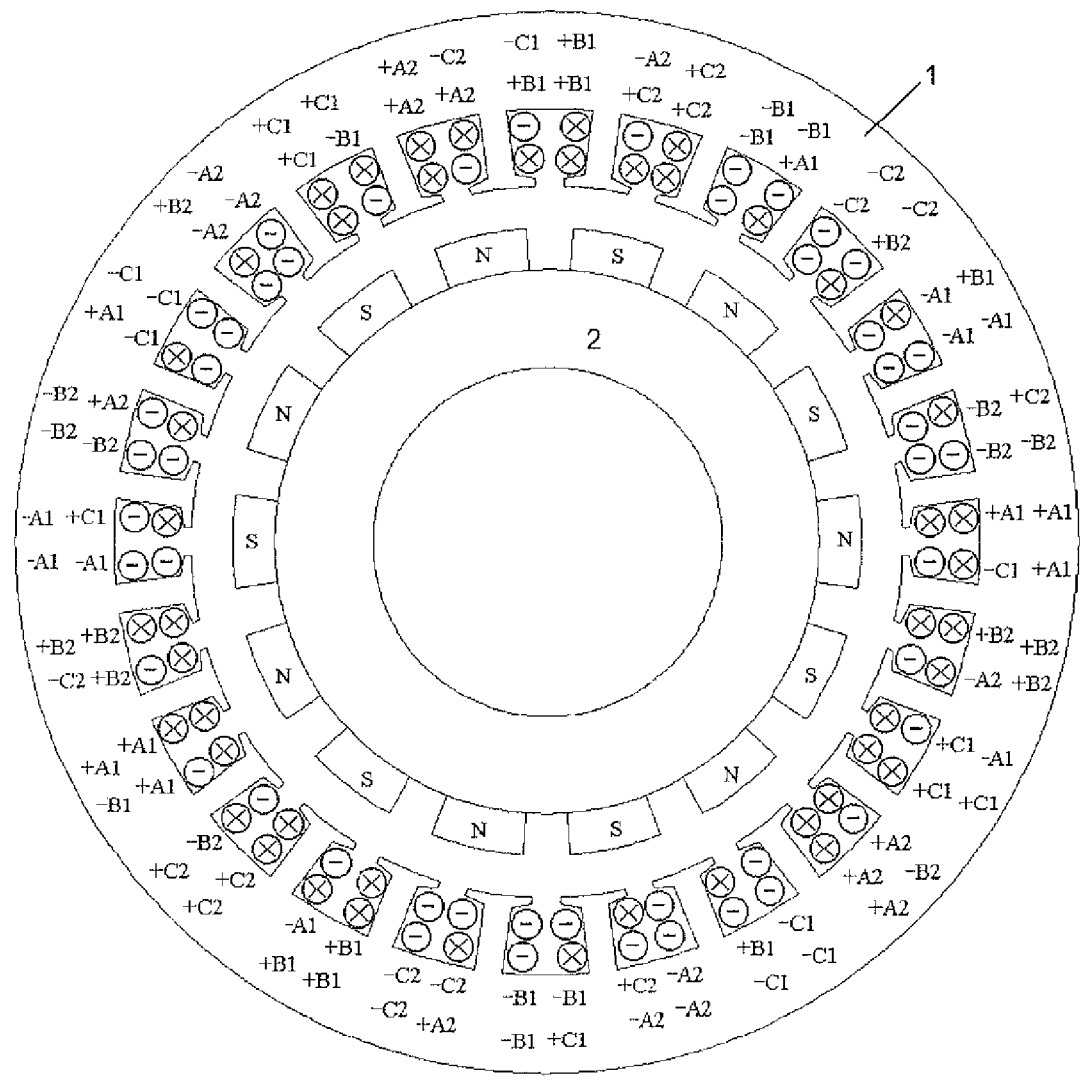
FIG. 11A shows a further exemplary embodiment of the invention with subdividing the windings in two sub-windings in each case.
Figure 11B:
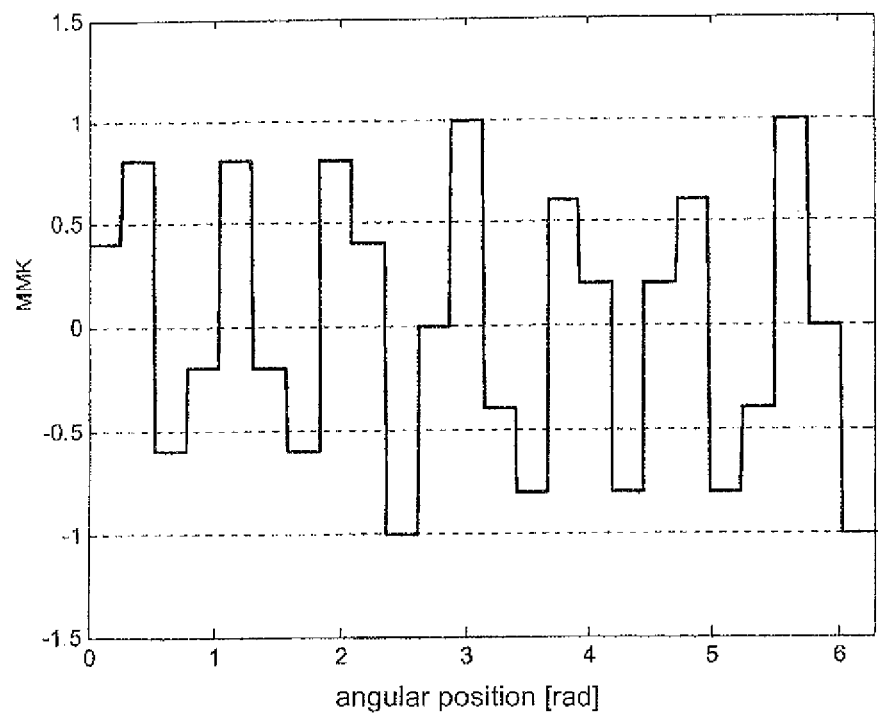
FIGS. 11B and 11C show associated diagrams of the magnetomotive force.
Figure 11C:
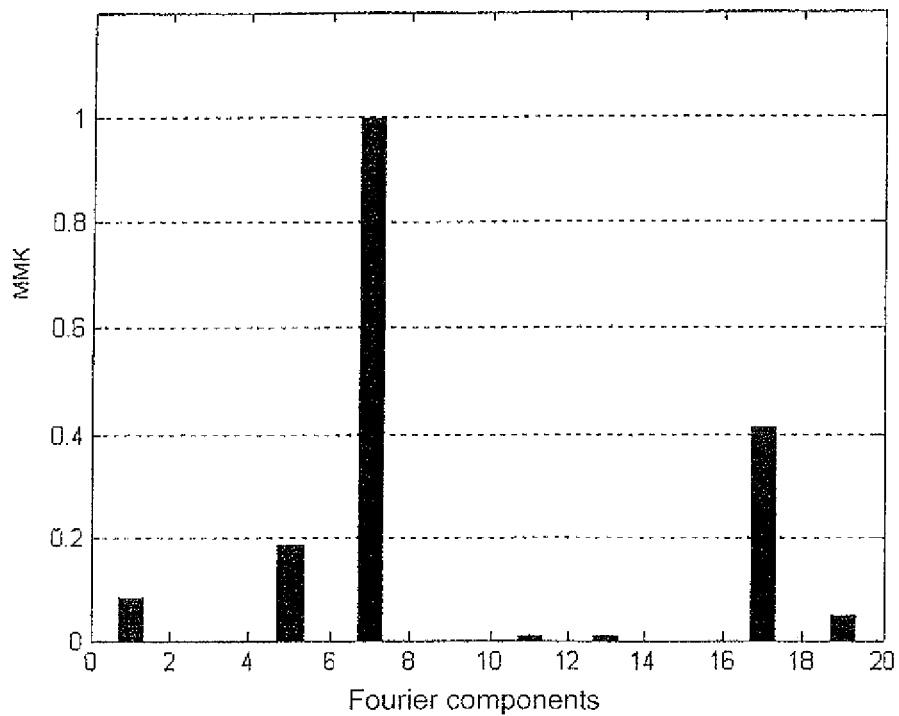
Figure 11D:
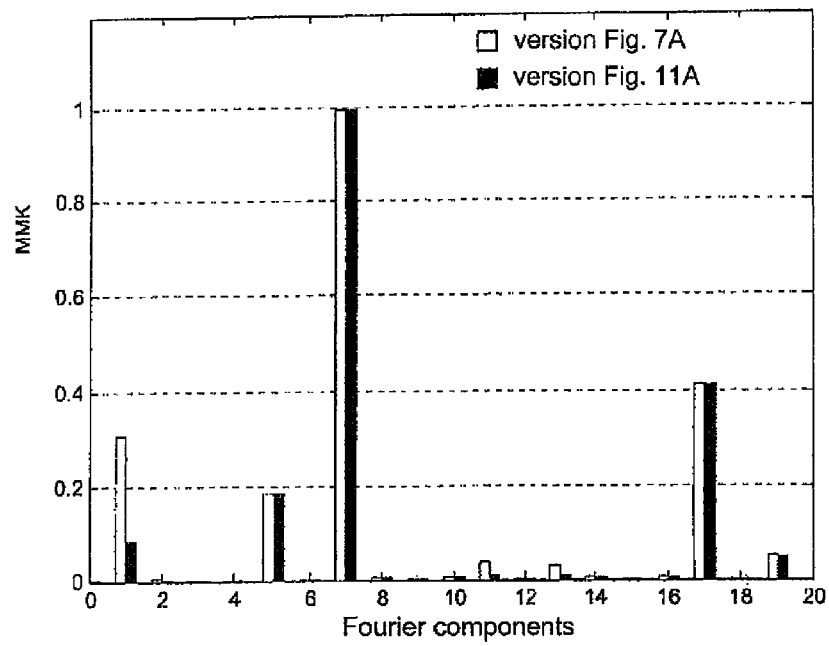
FIG. 11D shows a comparison of the diagram of FIG. 11C with the conventional principle.

Starting from FIG. 7A, FIG. 11A shows a further subdivision of the partial windings in two sub-windings in each case, in analogy to the previously described measure according to FIG. 5A supra. This allows reducing the first and the fifth undesired harmonic components, as is shown by means of FIGS. 11B to 11D.

Figure 12A:
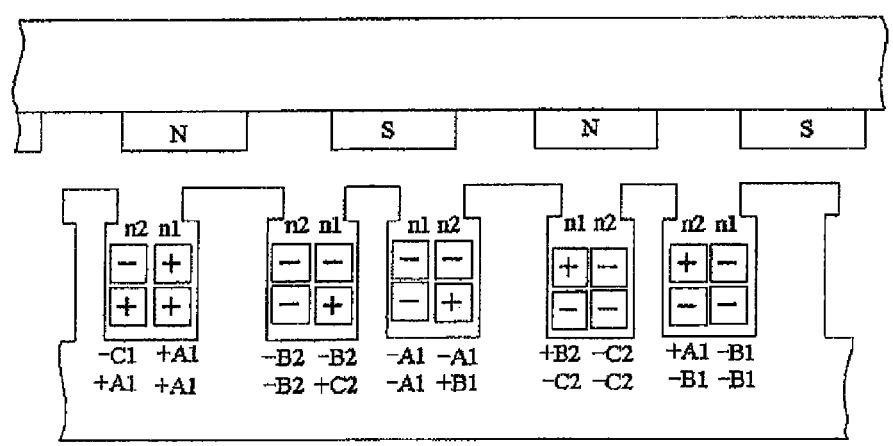
FIG. 12A shows a further exemplary embodiment of the invention with differing numbers of turns per phase winding, differing tooth widths and on the basis of the topology of the winding according to FIG. 11A, FIGS. 12B and 12C show associated diagrams of the magnetomotive force.
Figure 12B:
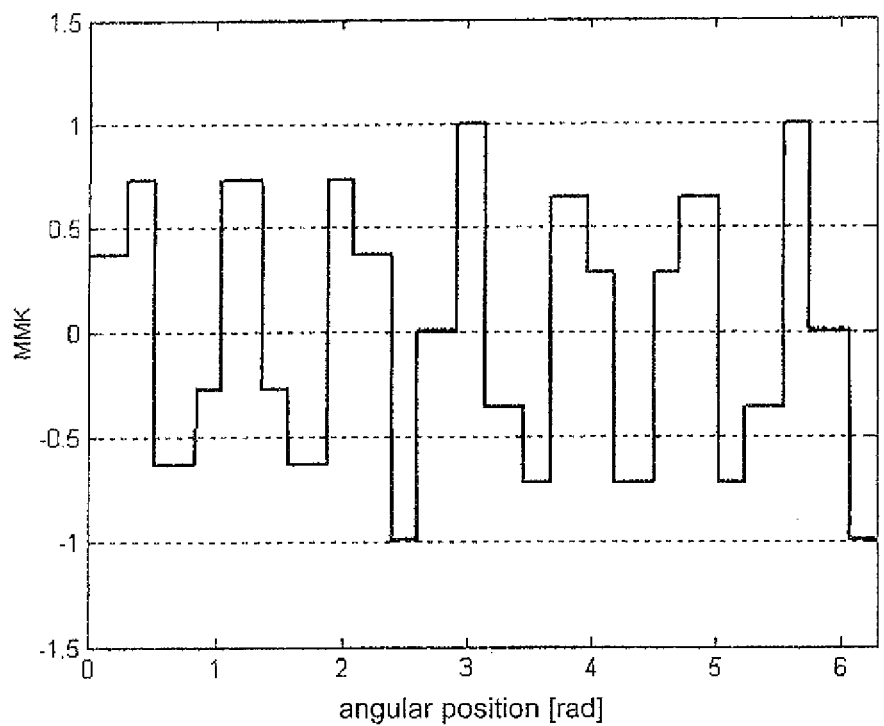
FIG. 12D shows a comparison between FIG. 12C and the conventional principle.
Figure 12C:
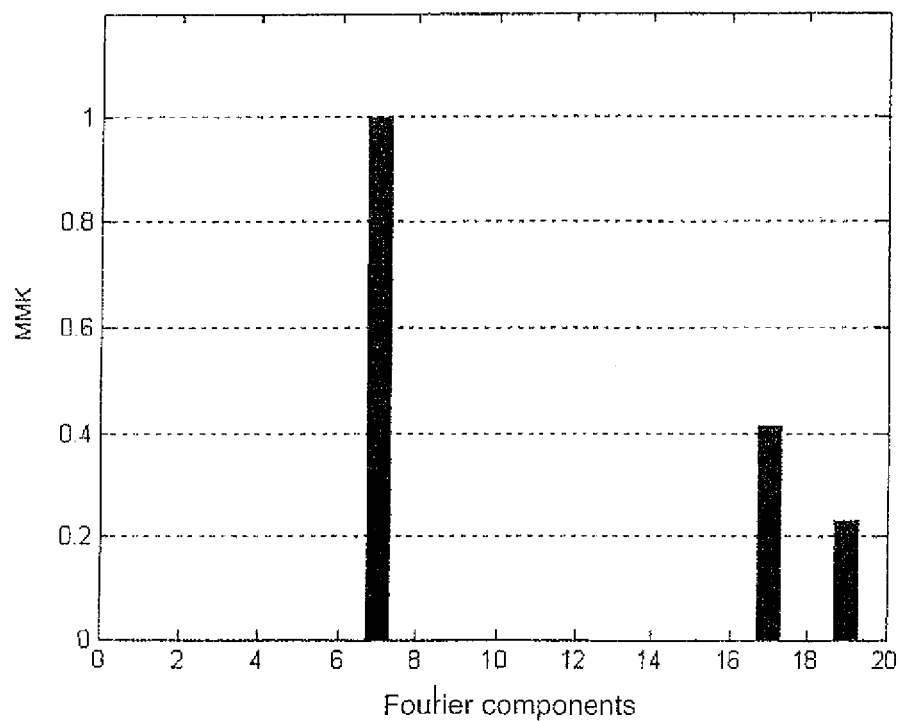
Figure 12D:
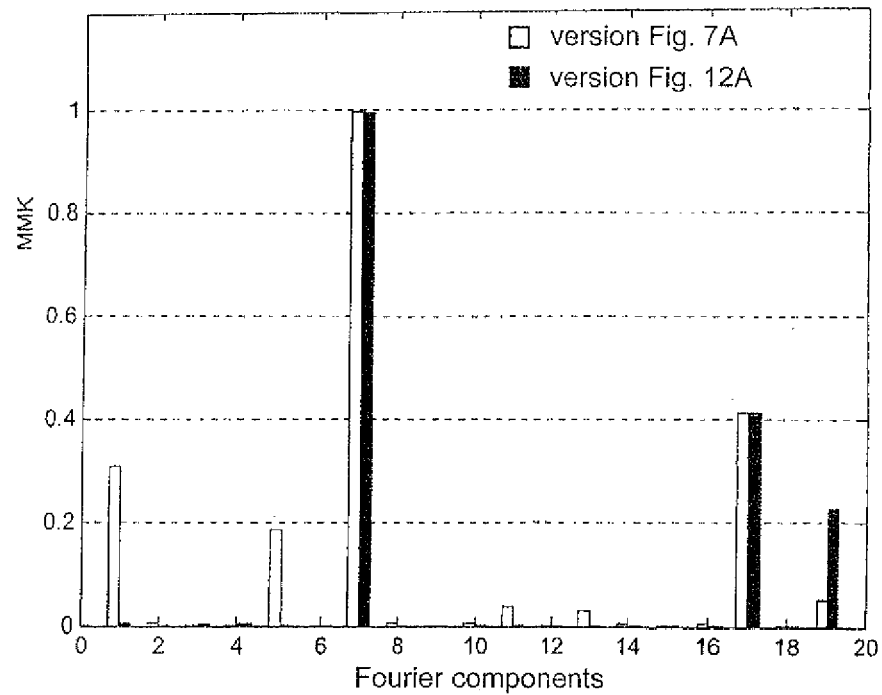

A combination of the principles of FIG. 11A with a differing number of turns per phase winding on the one hand, and differing tooth widths on the other hand is exemplarily indicated in FIG. 12A. As a result, the undesired components of the first and fifth orders are reduced to zero and hence fully eliminated, as is shown in FIGS. 12B to 12D.

Figure 13A:
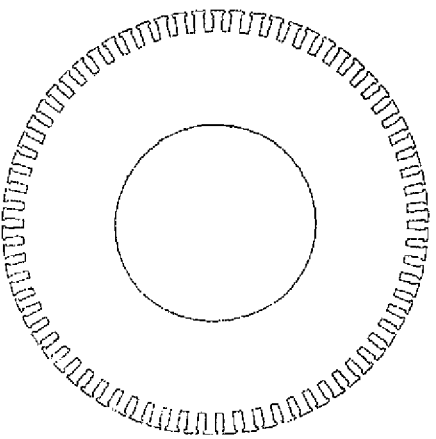
FIGS. 13A to 13I show different exemplary embodiments of rotors according to the invention.
Figure 13B:
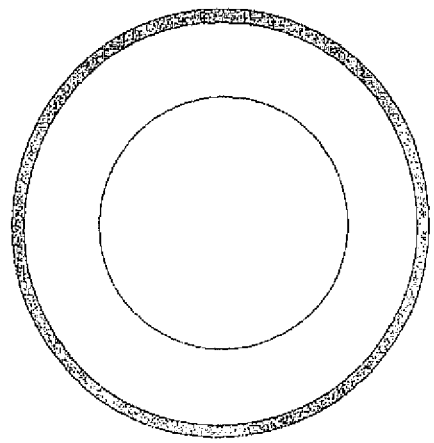
Figure 13C:
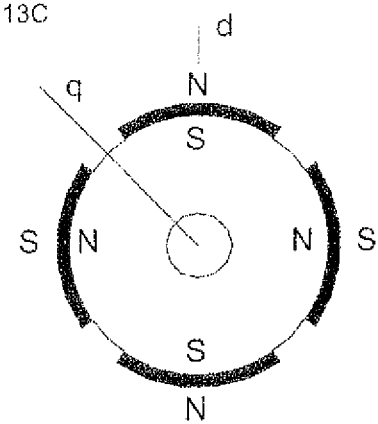
Figure 13D:
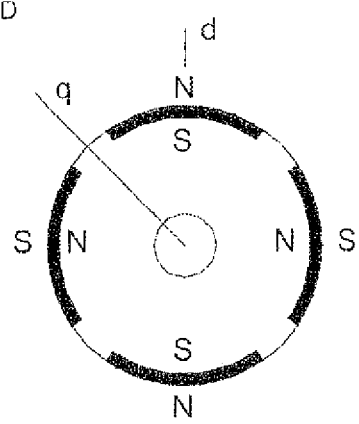
Figure 13E:
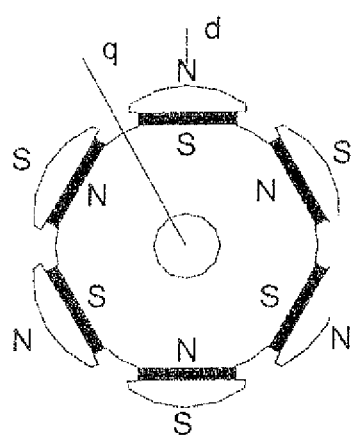
Figure 13F:
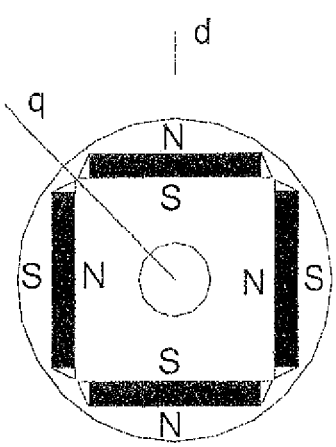

FIGS. 13A to 13I show different rotor types, as they may be used in the preceding examples according to FIGS. 1A to 12A. Instead of the design of the rotors comprising permanent magnets which is shown there, a cage rotor may be used, for instance, as it is shown in FIG. 13A. Another possibility of realizing an asynchronous machine is shown in FIG. 13B based on the multi-layered rotor indicated there. A further layer, for instance comprising copper or aluminum, is applied around the actual rotor core.

FIGS. 13C to 13I show several different embodiments of rotors when used in permanent magnet type machines. Whereas the permanent magnets having a pole pair number of 2 are externally applied onto the rotor core in FIG. 13C, buried magnets are provided in FIG. 13D. Instead of the pole pair number of 2 in FIGS. 13C and 13D, provision is made according to FIG. 13E to employ six flat magnet poles which have caps applied thereon in order to achieve a high rotational symmetry of the rotor. Unlike FIGS. 13C and 13D, FIG. 13F also shows the use of planar magnets.

Figure 13G:
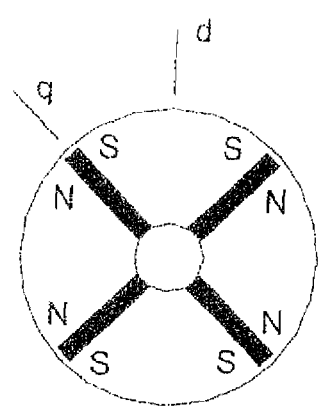
Figure 13H:
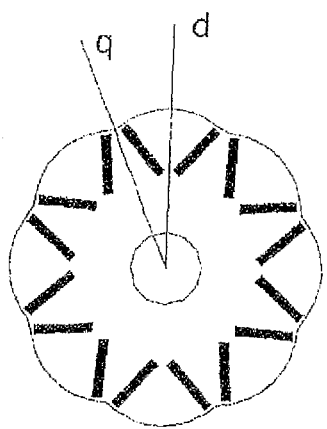
Figure 13I:
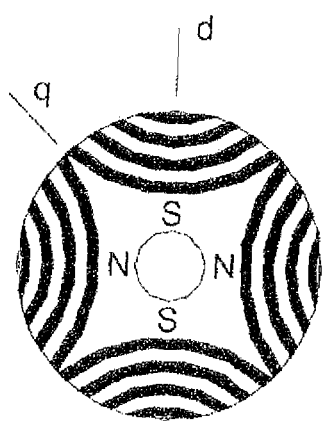

According to FIG. 13G, the magnets are not arranged essentially along the circumference, but radially inserted as buried magnets. Further exemplary designs of buried magnets are indicated in FIGS. 13H and 13I.

For the sake of completeness, it is to be noted that the designs according to FIGS. 13A to 13G have differing pole numbers.

Figure 14:
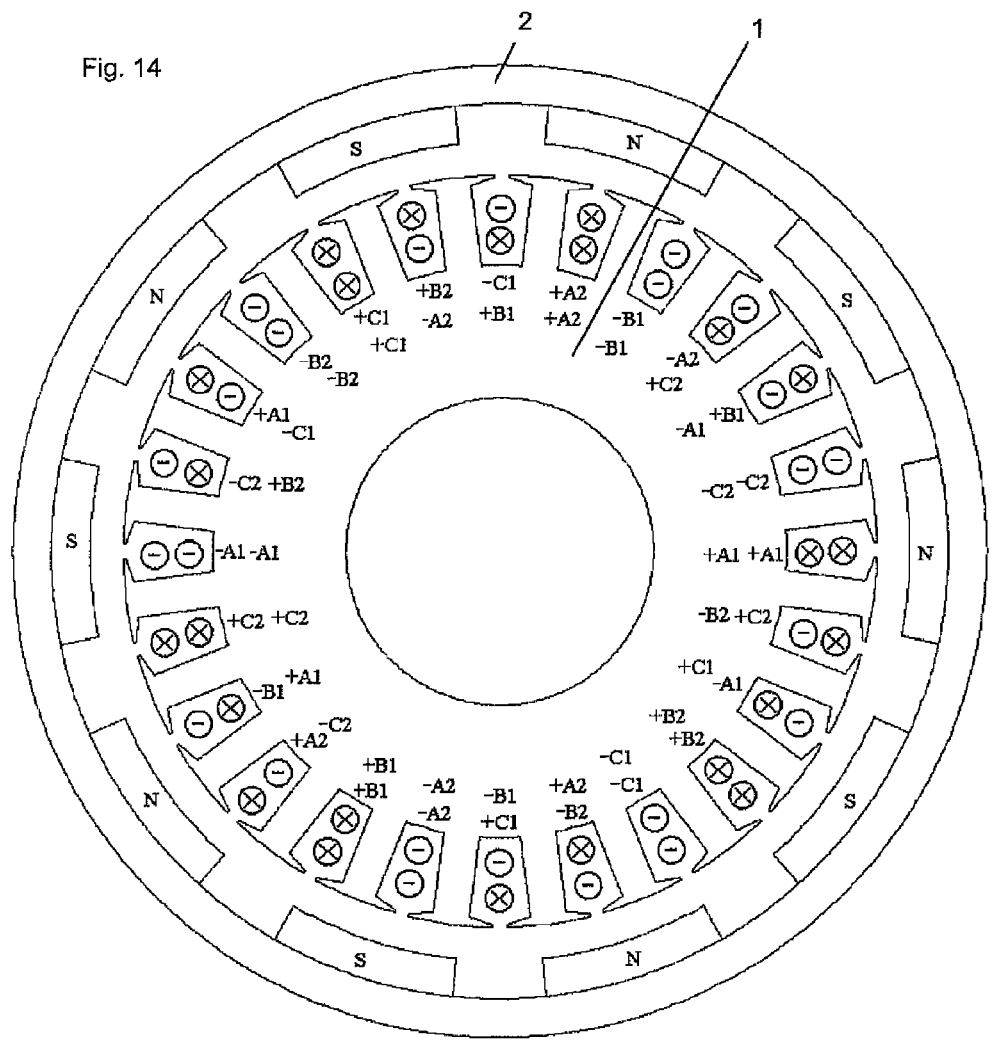
FIG. 14 shows an exemplary embodiment with external rotor.

FIG. 14 shows on the basis of an exemplary embodiment that all preceding embodiments may be realized vice versa as a machine with external rotor and internal stator instead of having an external stator and internal rotor.

Figure 15:
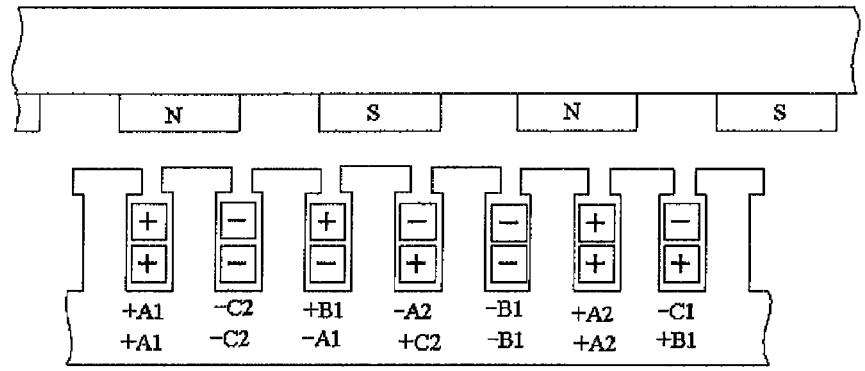
FIG. 15 shows an exemplary embodiment with linear motor.

Further, the suggested principle may also be realized as a linear motor, for instance with permanent magnets, as in FIG. 15.

Figure 16:
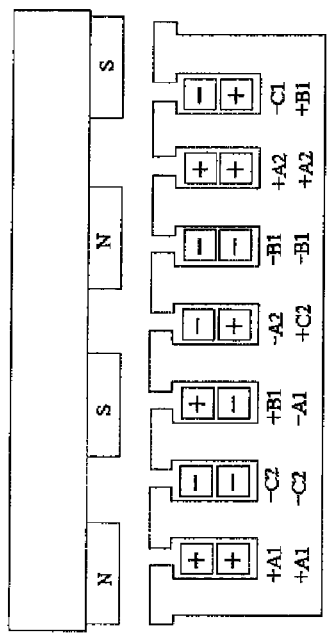
FIG. 16 shows an exemplary embodiment with an axial-flux type motor and permanent magnets.
Figure 17:
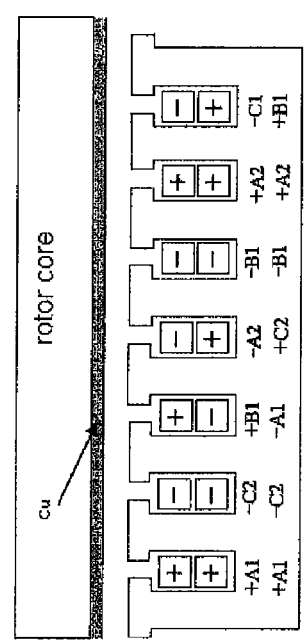
FIG. 17 shows an exemplary embodiment of a multilayered axial-flux type asynchronous motor according to the invention.

FIG. 16 shows another design with an axial-flux type permanent-magnet motor, whereas FIG. 17 shows an exemplary embodiment with an axial-flux type asynchronous rotor in multilayer design.

All the designs which are shown may have integer multiples with respect to the number of the notches and the pole number, instead of the 24/10 or 24/14 topologies which are illustrated by way of example. Thus, in particular 48/20 or 48/28 as well as 72/30 or 72/42 are advantageous topologies in the context of the invention.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An electrical machine, comprising:
a stator;
a rotor which can be moved relative to the stator and has a pole pair number p, the stator comprising a first and at least one second electrical windings;
wherein the stator has a doubled number of notches with respect to the required minimum number of notches for the given pole pair number p of the rotor;
wherein a number of turns of the first electrical winding differs from a number of turns of the second electrical winding in a notch of the stator; and
wherein the doubled number of notches in the stator is related to the required minimum number of notches of a winding topology comprising a winding with two multiphase partial windings, the partial windings being electrically connected to one another and mechanically shifted relative to one another.

2. The electrical machine according to claim 1, wherein the number of the notches is doubled with respect to the minimum number of notches required for the given pole pair number p of the rotor and further a given number of coils of a strand on neighboring teeth and for a given number of the strands.

3. The electrical machine according to claim 1, wherein the number of turns of the first electrical winding and the number of turns of the second electrical winding differ from each other such that a first undesired sub-harmonic component of the magnetomotive force induced by the stator is reduced in operation of the electrical machine.

4. The electrical machine according to claim 1, wherein the number of turns of the first electrical winding ranges in an interval between and including 50% and 100% of the number of turns of the second electrical winding.

5. The electrical machine according to claim 1, wherein at least two windings with differing numbers of turns are arranged in each notch of the stator.

6. The electrical machine according to claim 1, wherein each winding is arranged so as to surround at least two neighboring teeth of the stator, each of the teeth of the stator being formed between neighboring notches of the stator.

7. The electrical machine according to claim 1, wherein the stator comprises a three-phase winding.

8. The electrical machine according to claim 1, wherein the ratio between the number of the notches and the number of the poles is 24/10 or 24/14 or is defined in each case by integer multiples of the number of the notches and the number of the poles, the number of the poles being equal to twice the pole pair number p.

9. The electrical machine according to claim 1, wherein the rotor comprises at least one of the following types: cage rotor, multilayered rotor, permanent-magnet type rotor, rotor with buried magnets.

10. The electrical machine according to claim 1, being constructed as a machine with internal rotor or as a machine with external rotor.

11. The electrical machine according to claim 1, comprising one of the following types: linear motor, axial-flux type motor, asynchronous machine, synchronous machine.

12. The electrical machine according to claim 1, wherein a tooth width of a first tooth of the stator defined by a distance of neighboring notches differs from that of a second tooth of the stator.

13. An electrical machine, comprising:
a stator including a plurality of notches for receiving electrical windings; and
a rotor which can be moved relative to the stator,
wherein the stator has a doubled number of notches with respect to the required minimum number of notches for a given pole pair number p of the rotor,
wherein a tooth width of a first tooth of the stator defined by a distance of neighboring notches differs from that of a second tooth of the stator, and
wherein the doubled number of notches in the stator is related to the required minimum number of notches of a winding topology comprising a winding with two multiphase partial windings, the partial windings being electrically connected to one another and mechanically shifted relative to one another.

14. The electrical machine according to claim 13, wherein the tooth width of the first tooth differs from that of the second tooth such that an undesired, higher harmonic component of the magnetornotive force induced by the stator is reduced in operation of the electrical machine.

15. The electrical machine according to claim 13, wherein the tooth width of the first tooth ranges in an interval of between 50% and 100% of the tooth width of the second tooth.

16. The electrical machine according to claim 13, wherein teeth of differing tooth widths are arranged in periodically alternating fashion.

17. The electrical machine according to claim 13, wherein each winding is arranged so as to surround at least two neighboring teeth of the stator.

18. The electrical machine according to claim 13, wherein the stator comprises a three-phase winding.

19. The electrical machine according to claim 13, wherein the ratio between the number of the notches and the number of the poles is 24/10 or 24/14 or is defined in each case by integer multiples of the number of the notches and the number of the poles, the number of the poles being equal to twice the pole pair number p.

20. The electrical machine according to claim 13, comprising one of the following types: linear machine, axial-flux type machine, radial-flux type machine, asynchronous machine, synchronous machine.

21. The electrical machine according to claim 13, constructed as a machine with an internal rotor or as a machine with an external rotor.

22. The electrical machine according to claim 13, wherein the rotor comprises at least one of the following types: cage rotor, multilayered rotor, permanent-magnet type rotor, rotor with buried magnets, electrically supplied rotor, in particular full-pole type rotor, salient-pole type rotor, heteropolar rotor, homopolar rotor.

23. The electrical machine according to claim 13, wherein the stator comprises at least one first and at least one second electrical winding of an electrical phase, and a number of turns of the first electrical winding differs from a number of turns of the second electrical winding in a notch of the stator.

* * * * *